(12) United States Patent
Shin

(10) Patent No.: US 12,147,669 B2
(45) Date of Patent: Nov. 19, 2024

(54) APPARATUS AND METHOD FOR PROGRAMMING OR READING DATA BASED ON A PROGRAM STATUS OF A NON-VOLATILE MEMORY DEVICE

(71) Applicant: SK hynix Inc., Gyeonggi-do (KR)

(72) Inventor: Seung Hwan Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/993,678

(22) Filed: Nov. 23, 2022

(65) Prior Publication Data

US 2024/0012563 A1 Jan. 11, 2024

(30) Foreign Application Priority Data

Jul. 11, 2022 (KR) ........................ 10-2022-0084914

(51) Int. Cl.
*G06F 3/06* (2006.01)
(52) U.S. Cl.
CPC ............ *G06F 3/061* (2013.01); *G06F 3/0659* (2013.01); *G06F 3/0679* (2013.01); *G06F 2212/7203* (2013.01)
(58) Field of Classification Search
CPC ...... G06F 3/061; G06F 3/0659; G06F 3/0679; G06F 2212/7203
See application file for complete search history.

(56) References Cited

U.S. PATENT DOCUMENTS

| | | | | |
|---|---|---|---|---|
| 2011/0149650 | A1* | 6/2011 | Huang | G06F 12/0246 365/185.08 |
| 2013/0141972 | A1* | 6/2013 | Yoon | G11C 14/0018 365/185.18 |
| 2017/0285950 | A1* | 10/2017 | Lee | G11C 16/26 |

FOREIGN PATENT DOCUMENTS

| | | |
|---|---|---|
| KR | 10-2019-0124591 A | 11/2019 |
| KR | 10-2021-0055376 A | 5/2021 |

* cited by examiner

*Primary Examiner* — Kalpit Parikh
(74) *Attorney, Agent, or Firm* — IP & T GROUP LLP

(57) ABSTRACT

A memory device includes a first memory group and a control device. The first memory group includes a first non-volatile memory cell configured to store multi-bit data. The control device performs plural program operations to store the multi-bit data in the first non-volatile memory cell. The control device performs, in response to a read command before most significant bit data among the multi-bit data is programmed into the first non-volatile memory cell, a read operation for obtaining bit data, which has been programmed in the first non-volatile memory cell, among the multi-bit data, according to a program state of the first non-volatile memory cell while the plural program operations are performed. The control device outputs data obtained corresponding to the read command.

18 Claims, 18 Drawing Sheets

FIG. 16

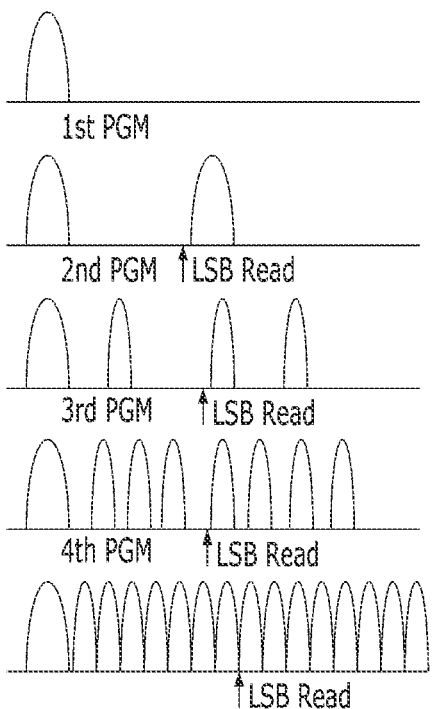

LSB PAGE READ OPERATION IS PERFORMED WITHOUT FLAG CELL SENSING IN A CASE WHEN 1ST PROGRAM REGARDING 1ST BIT DATA (LSB DATA) IS COMPLETED

LSB PAGE READ OPERATION IS PERFORMED WITHOUT FLAG CELL SENSING IN A CASE WHEN 2ND PROGRAM REGARDING 2ND BIT DATA IS COMPLETED

LSB PAGE READ OPERATION IS PERFORMED WITHOUT FLAG CELL SENSING IN A CASE WHEN 3RD PROGRAM REGARDING 3RD BIT DATA IS COMPLETED

LSB PAGE READ OPERATION IS PERFORMED WITHOUT FLAG CELL SENSING IN A CASE WHEN 4TH PROGRAM REGARDING 4TH BIT DATA IS COMPLETED

FIG. 17
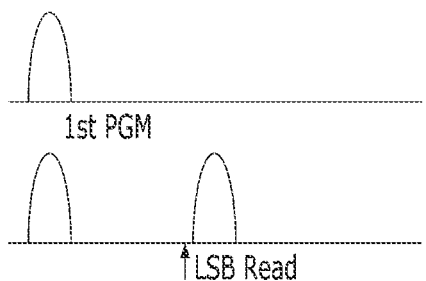
LSB PAGE READ OPERATION IS PERFORMED WITHOUT FLAG CELL SENSING IN A CASE WHEN 1ST PROGRAM REGARDING 1ST BIT DATA (LSB DATA) IS COMPLETED
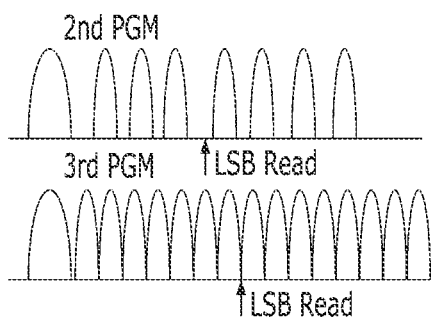
LSB PAGE READ OPERATION IS PERFORMED WITHOUT FLAG CELL SENSING IN A CASE WHEN 2ND PROGRAM IS COMPLETED
LSB PAGE READ OPERATION IS PERFORMED WITHOUT FLAG CELL SENSING IN A CASE WHEN 3RD PROGRAM IS COMPLETED FIG. 18
1st PGM
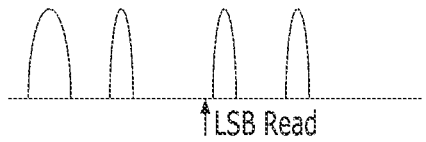
↑LSB Read
LSB PAGE READ OPERATION IS PERFORMED WITHOUT
FLAG CELL SENSING IN A CASE WHEN 1ST PROGRAM
REGARDING IS COMPLETED
2nd PGM
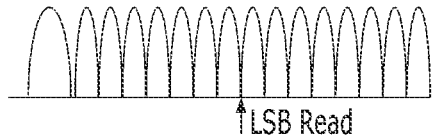
↑LSB Read
LSB PAGE READ OPERATION IS PERFORMED WITHOUT
FLAG CELL SENSING IN A CASE WHEN 2ND PROGRAM
IS COMPLETED

APPARATUS AND METHOD FOR PROGRAMMING OR READING DATA BASED ON A PROGRAM STATUS OF A NON-VOLATILE MEMORY DEVICE

CROSS-REFERENCE TO RELATED APPLICATIONS

This patent application claims the benefit of Korean Patent Application No, 10-2022-0084914, filed on Jul. 11, 2022, the entire disclosure of which is incorporated herein by reference.

TECHNICAL FIELD

One or more embodiments of the present disclosure described herein relate to a memory system, and an operation method thereof, and more particularly, to an apparatus and a method for programming or reading data in a non-volatile memory device of the memory system.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data.

BRIEF DESCRIPTION OF THE DRAWINGS

The description herein makes reference to the accompanying drawings wherein like reference numerals refer to like parts throughout the figures.

FIG. 16 illustrates a threshold voltage change of a non-volatile memory cell configured to store 4-bit data according to a first program method according to an embodiment of the present disclosure.

FIG. 17 illustrates a threshold voltage change of a non-volatile memory cell configured to store 4-bit data according to a second program method according to an embodiment of the present disclosure.

FIG. 18 illustrates a threshold voltage change of a non-volatile memory cell configured to store 4-bit data according to a third program method according to an embodiment of the present disclosure.

DETAILED DESCRIPTION

Figure 1:
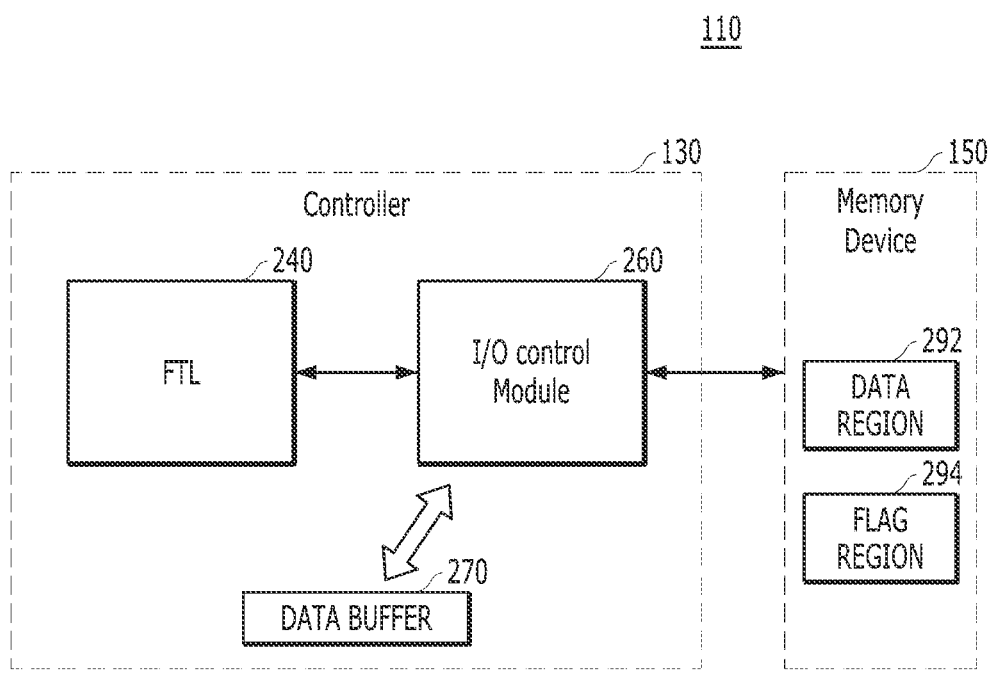
FIG. 1 illustrates a memory system according to an embodiment of the present disclosure.

Various embodiments of the present disclosure are described below with reference to the accompanying drawings, Elements and features of this disclosure may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. Furthermore, the terms in a claim do not foreclose the apparatus from including additional components, e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. The block/unit/circuit/component used with the "configured to" language include hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of "circuitry" or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B," While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment in the present disclosure can provide a memory system, a data processing system, and an operation process or a method, which may quickly and reliably process data into a memory device by reducing operational complexity and performance degradation of the memory system, thereby enhancing usage efficiency of the memory device.

An embodiment of the present disclosure can provide an apparatus or a method for improving an input/output operation performance of the memory system.

In an embodiment, a memory system can include a first memory group including a first non-volatile memory cell configured to store multi-bit data; and a control device configured to: perform plural program operations to store the multi-bit data in the first non-volatile memory cell; perform, in response to a read command before most significant bit data among the multi-bit data is programmed into the first non-volatile memory cell, a read operation for obtaining bit data, which has been programmed in the first non-volatile memory cell among the mufti-bit data according to a program state of the first non-volatile memory cell while the plural program operations are performed; and output the bit data obtained corresponding to the read command.

The memory device can be configured to determine the program state based on a number of bits of data stored in the first non-volatile memory cell among the multi-bit data.

The control device can be further configured to change a level of a read voltage applied to the first non-volatile memory cell during the read operation according to the program state of the first non-volatile memory cell.

The control device is further configured to raise a level of a read voltage applied to the first non-volatile memory cell for reading the least significant bit data as a number of bits of data programmed in the first non-volatile memory cell increases among the multi-bit data.

The control device can be configured to perform the plural program operations in the first non-volatile memory cell in an order of least significant bit data to the most significant bit data among the multi-bit data.

The memory device can further include a data buffer configured to temporarily store write data including the multi-bit data to be stored in the first non-volatile memory cell. The control device can be further configured to remove a part of the write data, corresponding to the bit data, from the data buffer, after the bit data has been programmed in the first non-volatile memory cell and before all of the mufti-bit data is programmed in the first non-volatile memory cell.

The memory system can further include a second memory group including a second non-volatile memory cell storing a flag corresponding to the program state regarding the first non-volatile memory cell. The control device can be further configured to read the flag stored in the second non-volatile memory cell to recognize the program state regarding the first non-volatile memory cell, before performing the read operation for the first non-volatile memory cell.

The control device can be further configured to perform an error correction operation on data obtained from the first memory group, while skipping the error correction operation on the flag obtained from the second memory group.

The memory device can further include a register configured to record information representing whether a program operation is completed with bit data respect to recently programmed in the first nonvolatile memory cell among the multi-bit data performed.

The control device can be further configured to perform a program state check operation regarding the first non-volatile memory cell to recognize the program state based on the information recorded in the register.

In another embodiment, a method for operating a memory system can include programming least significant bit data among multi-bit data in a first non-volatile memory cell that is configured to store the multi-bit data; performing a read operation on the least significant bit data programmed in the first non-volatile memory cell in response to a read command before programming most significant bit data among the multi-bit data in the first non-volatile memory cell; and outputting the least significant bit data in response to the read command to the external device.

The method can further include programming a flag, which indicates whether the programming of the least significant bit data is completed in the first nonvolatile memory cell, in a second non-volatile memory cell; programming. in the first non-volatile memory cell, bit data other than the least significant bit data among the multi-bit data; and updating the flag in response to whether the programming of the bit data other than the least significant bit data is completed.

The method can further include terminating a program operation in the first non-volatile memory cell after the programming the bit data is completed when the bit data other than the least significant bit data is the most significant bit data; programming, in the first non-volatile memory cell when the bit data other than the least significant bit data is not the most significant bit data, another bit data other than the least significant bit data among the multi-bit data; and updating the flag according to whether the programming of the another bit data other than the least significant bit data is completed.

The method can further include storing, in a register, an indicator showing whether the programming of the least significant bit data is completed after the programming of the least significant bit data is completed; programming, in the first non-volatile memory cell, bit data other than the least significant bit data among the mufti-bit data; and updating the indicator stored in the register according to completion of the programming of the bit data other than the least significant bit data.

The performing the read operation can include determining a level of a read voltage according to a program state of the first non-volatile memory cell; and reading the least significant bit data by applying the read voltage having the determined level to the first non-volatile memory cell.

The method can further comprises determining the program state based on a number of bits of data programmed in the first non-volatile memory cell among the mufti-bit data.

The multi-bit data can be programmed in the first non-volatile memory cell in an order of the least significant bit to most significant bit data. The level of the read voltage is increased as the number of bits of data programmed in the first non-volatile memory cell increases among the mufti-bit data.

In another embodiment, a memory system can include a memory die including a first non-volatile memory cell configured to store multi-bit data; and a controller configured to read, in response to a read command before most significant bit data among the mufti-bit data is programmed into the first non-volatile memory cell bit data already programmed in the first non-volatile memory cell according to a program state of the first non-volatile memory cell, wherein the bit data is a part of the mufti-bit data.

The memory system can further include a data buffer configured to temporarily store write data including the multi-bit data to be stored in the first non-volatile memory cell. The controller can be further configured to remove a part of the write data, corresponding to the bit data, from the data buffer, after the bit data has been programmed in the first non-volatile memory cell and before all of the mufti-bit data is programmed in the first non-volatile memory cell.

The controller can be configured to determine the program state on a number of bits of data programmed in the first non-volatile memory cell among the mufti-bit data. The controller is configured to determine a level of a read voltage based on the program state and perform a read operation for obtaining the bit data by applying the read voltage to the first non-volatile memory cell.

In an embodiment, an operating method of a controller can include: controlling a memory device to sequentially program a sequence of data bits of multi-bit data while recording information representing sequential completion of the programming whenever each data bit of the sequence is programmed; and controlling the memory device to read, before completing the programming of the multi-bit data, an already-programmed data bit among the sequence by determining a read voltage for the reading based on the recorded information at a time point of the reading.

An embodiment described herein can provide an apparatus and a method for improving a data input/output operation of a memory system or a data processing system.

Embodiments will now be described with reference to the accompanying drawings, wherein like numbers reference like elements.

FIG. 1 illustrates a memory system according to an embodiment of the present disclosure. The memory system 110 can store a data entry and output the stored data entry. The memory system 110 can include an area capable of storing a data entry, and a control device capable of performing an operation for storing, erasing, or reading a data entry. Examples of components included in the memory system 110 will be described later with reference to FIGS. 2 to 3.

Referring to FIG. 1, the memory system 110 can include a memory device 150 and a controller 130. The memory device 150 and the controller 130 included in the memory system 110 might be a type of components which are physically separated from each other. The memory device 150 and the controller 130 can be connected to each other through at least one data path or at least one communication line. For example, the data path and the communication line could include a channel and/or a way.

According to an embodiment, the memory device 150 and the controller 130 may be a type of components which are functionally separated from each other. Also, according to an embodiment, the memory device 150 and the controller 130 could be implemented through a single chip or a plurality of chips.

The controller 130 can include a Flash Translation Layer (FTL) 240 and an input/output control module 260. The flash translation layer (FTL) 240 included in the controller 130 can perform a data processing operation for transferring a data entry (e.g, host data) transferred from an external device (e.g.., the host 102, see FIG. 2) to the memory device 150 in order to store the data entry in the memory device 150. Because an address scheme (e.g., a logical address scheme) used by the external device and an address scheme (e.g., a physical address scheme) used within the memory system 110 are different from each other, the flash translation layer (FTL) 240 can determine a location in which the data entry is stored in the memory device 150. Also, the flash translation layer (FTL) 240 can generate map information, or a map data entry, which is used for associating a logical address and a physical address of the data entry with each other. Herein, the logical address regarding the data entry can be determined by the host 102, while the physical address regarding the data entry can be determined by the memory system 110.

The input/output control module 260 can control an operation for storing the data entry transferred from the flash conversion layer (FTL) 240 in the memory device 150. The memory device 150 can include a plurality of memory planes, each including a plurality of non-volatile memory cells. Data input/output operations can be performed in parallel within the memory device 150 to improve input/output operation performance. For example, when the input/output control module 260 can transmit a read command to the memory device 150, each of the plurality of memory planes in the memory device 150 can read a data entry stored in a plurality of memory cells and output the read data entry to the input/output control module 260 through channels. Further, the input/output control module 260 can schedule data input/output operations performed in the plurality of memory planes or plural regions, e.g., a first non-volatile cell region 292 and a second non-volatile cell region 294.

Figure 2:
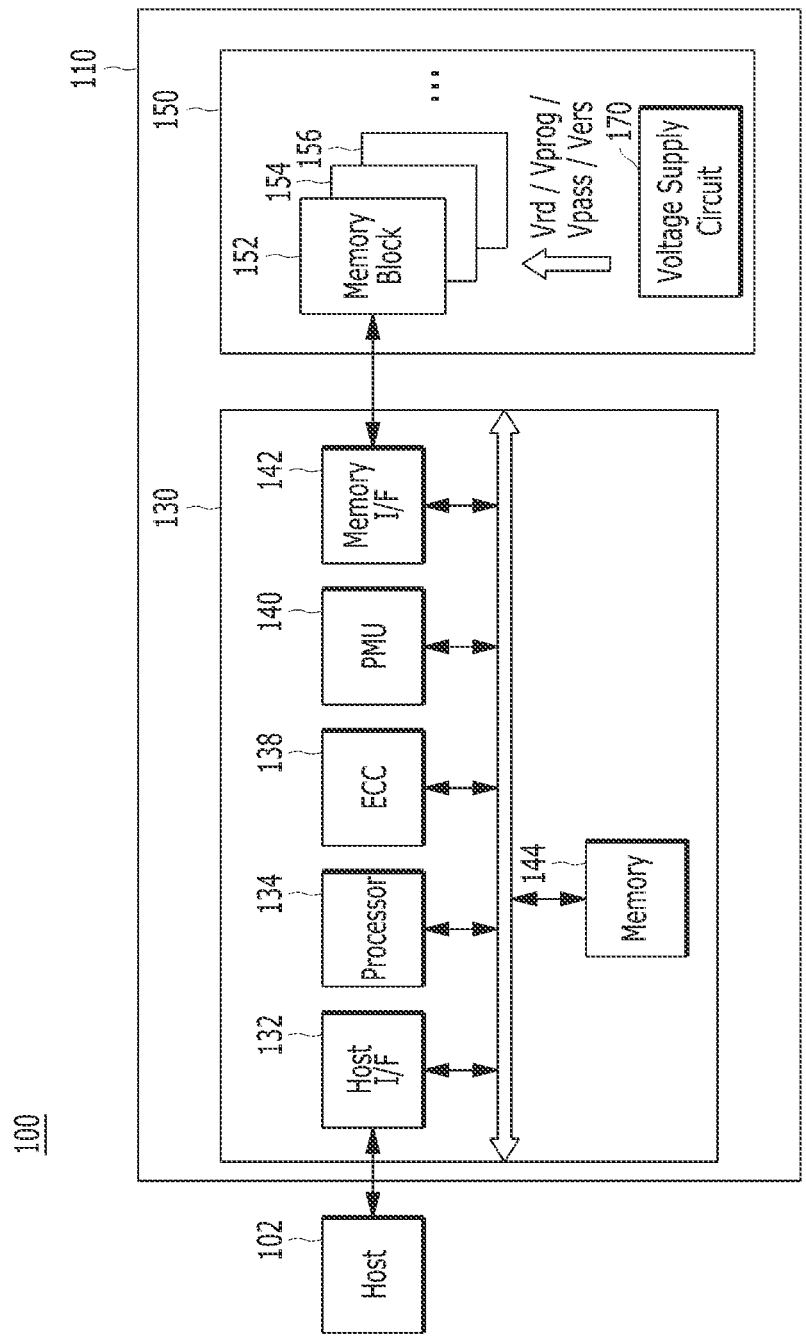
FIG. 2 illustrates a data processing system according to an embodiment of the present disclosure.
Figure 3:
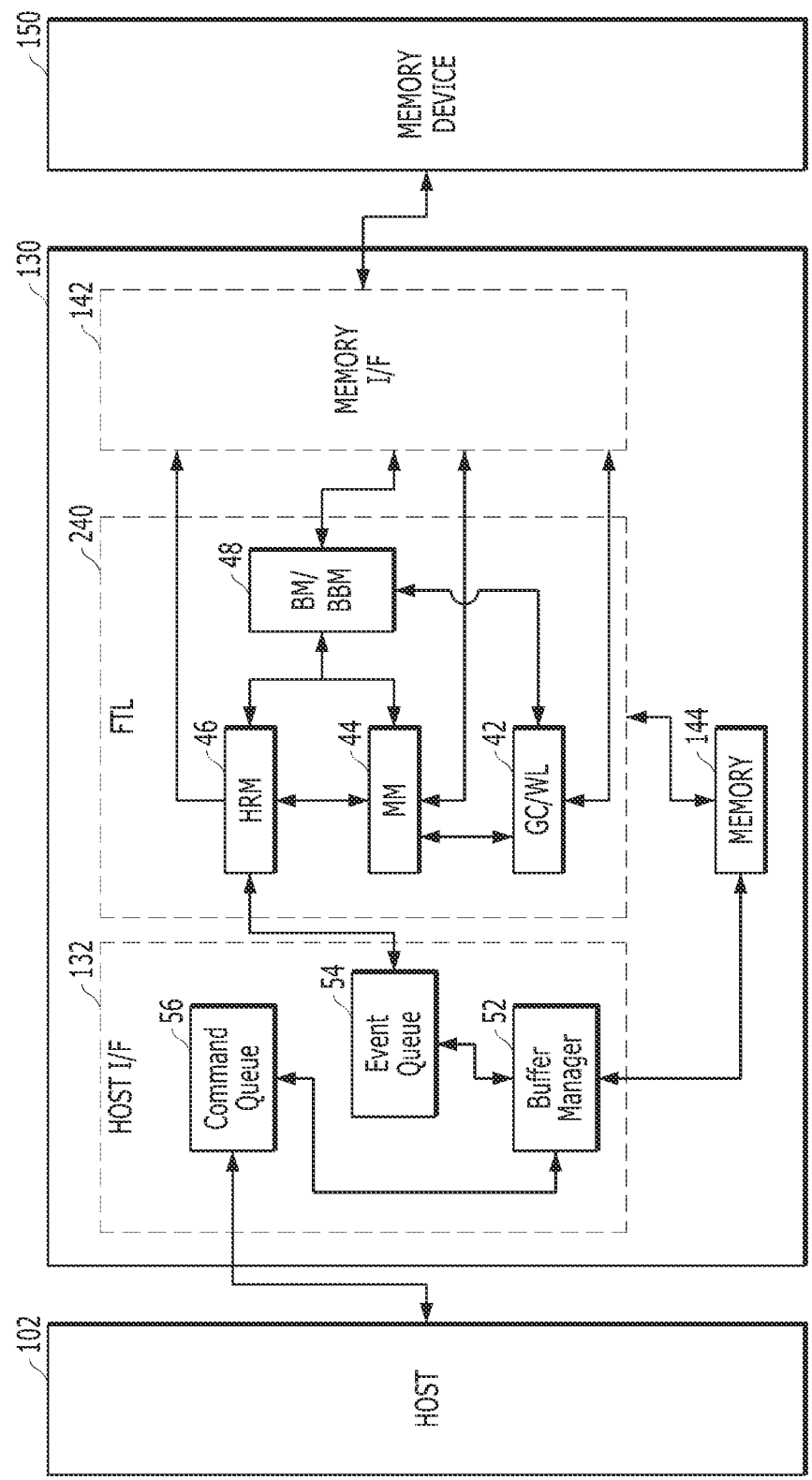
FIG. 3 illustrates a memory system according to another embodiment of the present disclosure.

According to an embodiment, the input/output control module 260 can be included in a memory interface 142 shown in FIGS. 2 and 3. According to another embodiment, the input/output control module 260 can be arranged between the flash conversion layer (FTL) 240 and the memory interface 142 shown in FIGS. 2 and 3.

Referring to FIG. 1, the memory device 150 can include plural regions, e.g., the first non-volatile cell region 292 and the second non-volatile cell region 294. For example, the plural regions can be included in a single memory die or a single memory plane. The memory die can include at least one of memory planes. The memory die can be understood as a type of components implemented on a physically distinguishable substrate. Each memory die can be connected to the controller 130 through a data path and include an interface for exchanging a data entry and a signal with the controller 130.

According to an embodiment, the memory device 150 can include a plurality of memory planes. The memory plane can include at least one memory block, a driving circuit which is configured to control an array including a plurality of non-volatile memory cells, and at least one buffer configured to temporarily store data input to or output from the plurality of non-volatile memory cells. The memory plane could be understood as a logical or physical partition including plural components.

The plural regions, e.g., the first non-volatile cell region 292 and the second non-volatile cell region 294, can include a plurality of memory blocks 152, 154, 156 (refer to FIG. 2). A memory block can be understood as a group of non-volatile memory cells from which data is erased together through an erase operation. The memory blocks 152, 154, 156 can include a page 292 which is a group of non-volatile memory cells that store data together during a program operation or output data together during a read operation. For example, data output from the page 292 can be output to the controller 130 through a data latch 294 and a cache latch 296. Each of the memory blocks 152, 154, 156 can include a plurality of pages 292. The internal configuration of the memory device 150 described with reference to FIG. 1 can be changed in response to operating performance of the memory system 110. An embodiment of the present disclosure is not limited to the internal configuration described with reference to FIG. 1. The configuration and operation of the memory device 150 will be described later with reference to FIG. 5.

Referring to FIG. 1, the plural regions 292, 294 included in the memory system 110 may include a plurality of non-volatile memory cells. For example, the plural regions 292, 294 may include a first non-volatile cell region 292 and a second non-volatile cell region 294. The first non-volatile cell region 292 and the second non-volatile cell region 294 can include a plurality of memory cells, each configured to store multi-bit data.

According to an embodiment, the first non-volatile cell region 292 may store a data entry, and the second non-volatile cell region 294 may store a flag. Herein, the data entry may include write data received by the memory system 110 from an external device (e.g., a host 102 referring to FIGS. 2 and 3) or metadata used for an internal operation in the memory system 110. The flag may include information indicating a program state of a non-volatile memory cell included in the first nonvolatile cell region 292. In another embodiment, data other than the flag can be stored in the second non-volatile cell region 294. According to an embodiment, the flag may be stored in a volatile memory (e.g., a memory 144 described in FIGS. 2 and 3) included in, or used by, the controller 130.

According to an embodiment, the first non-volatile cell region 292 and the second non-volatile cell region 294 included in the memory system 110 may store different types of data. For example, the first non-volatile cell region 292 may store a data entry transferred from an external device to be stored in the memory system 110. The second non-volatile cell region 294 may store parity information of the data entry stored in the first non-volatile cell region 292. Herein, the parity information may be used to recover data programmed in the first non-volatile cell region 292 when an interrupt or an error occurs during an operation in which data is programmed in the first non-volatile cell region 292.

The operation of programming multi-bit data in the first non-volatile cell region 292 including memory cells, each capable of storing the multi-bit data, may be performed in several steps. Or plural program operations may be performed in the first non-volatile cell region 292 to program the multi-bit data therein. According to an embodiment, in order to program the multi-bit data, the memory system 110 may perform a two-step programming operation or a multi-step programming operation. In another embodiment, the memory system 110 may perform a foggy programming operation and a fine programming operation to program the multi-bit data. An operation performed by the memory system 110 to store the mufti-bit data will be described later with reference to FIGS. 6 to 8.

A one-shot programming operation could be performed through plural program operations in which plural ISPP step pulses are applied successively to program multi-bit data in a non-volatile memory cell until the non-volatile memory cell connected to a specific word line of the first non-volatile cell region 292 is fully programmed with the multi-bit data. In the one-shot programming operation, plural program pulses are alternatively applied to plural word lines to perform plural program operations regarding the multi-bit data. While a program operation is performed through a specific word line, another program operation may not be performed through another word line. However, as an integration degree of the first non-volatile cell region 522 increases, a significant amount of cell-to-cell interference between non-volatile memory cells can occur when there is no program operation interleaving between neighboring word lines (e.g., between a word line on which a program operation is performed and another word line immediately adjacent to the word line).

To reduce an interference during a program operation, a two-step programming method may be used for storing multi-bit data in a non-volatile memory cell included in the first non-volatile cell region 522. In the two-step programming method, LSB data may be first programmed in a non-volatile memory cell having the threshold voltage corresponding to an erase state (a first step program operation), and then MSB data may be programmed in the non-volatile memory cell (a second step program operation). For example, after a LSB data entry is programmed in non-volatile memory cells connected to a specific word line, another LSB data entry may be programmed in non-volatile memory cells connected to another word line adjacent to the specific word line. A cell-to-cell interference could be reduced by programming the LSB data entries in the non-volatile memory cells connected to plural word lines and then sequentially programming MSB data entries in the non-volatile memory cells after the LSB data entries are programmed.

In the memory system 110, a size of data entries stored in non-volatile memory cells connected to plural word lines through a two-step programming method or a multi-step programming method is larger than a size of a data entry programmed in non-volatile memory cells coupled to a single word line. A time required for a program operation could be lengthy because a lot of data entries are programmed alternatively in non-volatile memory cells coupled to plural word lines through the two-step programming method or the multi-step programming method. Accordingly, a time for maintaining write data in a data buffer 270, configured to store the write data to be programmed in the first non-volatile cell region 292, could increase.

As the memory device 150 is configured to store more data, a size of data entries stored in the first non-volatile cell region 292 may increase. For example, a size of a page included in the first non-volatile cell region 292 may increase. When it is determined that a size of write data to be programmed into a plurality of non-volatile memory cells included in the first non-volatile cell region 292 is sufficient, the plurality of non-volatile memory cells included in the first non-volatile cell region 292 could be programmed with multi-bit data. When the plurality of non-volatile memory cells is programmed from least significant bit (LSB) data to most significant bit (MSB) data, a program operation on the plurality of non-volatile memory cells can be completed.

On the other hand, when a size of the write data is not sufficient, the multi-bit data might not be programmed in the plurality of non-volatile memory cells included in the first non-volatile cell region 292. When there is no more write data after some bit data (e.g., LSB data) among the multi-bit data is programmed in the plurality of non-volatile memory cells, a program operation for MSB data could not performed in the corresponding non-volatile memory cells. In this case, the program operation on the corresponding non-volatile memory cells might not be completed.

To avoid that the program operation might not be completed, the controller 130 can program dummy data, not write data, in the corresponding non-volatile memory cells. The dummy data can be considered useless data, but it has an advantage in that the program operation on the corresponding non-volatile memory cells can be completed quickly. When the program operation is completed, the controller 130 can delete or release the write data stored in the data buffer 270. Thus, utilization of resources in the memory system 110 could be increased.

A size of the data buffer 270 in the memory 144 might not be fixed but may be dynamically established. If the controller 130 does not delete the write data stored in the data buffer 270 in a state in which the program operation is not completed, the utilization of resources in the memory system 110 may be reduced. When write data remains in the data buffer 270, the memory system 110 might not be able to secure resources to be used for another input/output operation, so that I/O performance of the memory system 110 may decrease.

Even if write data is programmed in non-volatile memory cells, the memory system 110 should maintain the write data in the data buffer 270 when the program operation on the corresponding non-volatile memory cells is not completely programmed with the multi-bit data. It is because an error is highly likely to occur when data programmed in the non-volatile memory cells is read in a state in which the program operation on the non-volatile memory cells is not completed with the multi-bit data. According to an embodiment of the present disclosure, a level of a read voltage may be changed in response to a program state of a non-volatile memory cell. If the level of the read voltage is adjusted, a probability of an error occurring when the non-volatile memory cell is read while the program operation is not completed (e.g., when some bit data of the multi-bit data is programmed) may be reduced. Accordingly, bit data stored in the non-volatile memory cell may be read while some bit data among the multi-bit data is stored in the non-volatile memory cell (i.e., the MSB data is not programmed in the non-volatile memory cell). Through this, the controller 130 may release or delete write data corresponding to the bit data programmed in the non-volatile memory cell from the data buffer 270, so that the utilization of resources in the memory system 110 may be increased.

The memory system 110 may adjust a level of the read voltage applied to a non-volatile memory cell and control the data buffer 270, based on whether a program operation regarding some bit data among multi-bit data is programmed in the non-volatile memory cell even if the non-volatile memory cell is not fully programmed with the multi-bit data. According to an embodiment, the memory device 150 may program a flag corresponding to a program state of the non-volatile memory cell included in the first non-volatile cell region 292 in the second non-volatile cell region 294. For example, after the memory device 150 programs LSB data in a non-volatile memory cell included in the first non-volatile cell region 292, a flag corresponding to the LSB data could be programmed in a non-volatile memory cell included in the second non-volatile cell region 294. After the memory device 150 programs central significant bit (CSB) data in the non-volatile memory cell, which has been programmed with the LSB data in the first nonvolatile cell region 292, the flag corresponding to the CSB data could be updated in the second non-volatile cell region 294. According to an embodiment, 3rd bit data, 4th bit data, or more multi-bit data may be stored in a memory cell included in the first non-volatile cell region 292, and a flag stored in the second non-volatile cell region 294 can be updated or stored based on the 3rd bit data, 4th bit data, or more mufti-bit data programmed in the memory cell included in the first non-volatile cell region 292.

For example, when the first step program operation is completed in the first non-volatile cell region 292, the memory system 110 could be recognized that at least some bit data corresponding to the first step program operation is programmed in non-volatile memory cells of the first non-volatile cell region 522. After the first step program operation is completed in the first non-volatile cell region 292 in the memory system 110, a second step program operation may be performed in the first non-volatile cell region 292, or a read operation for the at least some bit data that has already been programmed through the first stage program operation may be performed in the first non-volatile cell region 292 before the second step program operation is performed.

Whenever a step-by-step (or multi-step) program operation is completed in the first non-volatile cell region 292, the memory device 150 may notify the controller 130 that the corresponding step program operation is completed. Here, each step program operation may include a program operation for programming at least one bit data in a non-volatile memory cell included in the first non-volatile cell region 292.

The controller 130 can release or delete some of the write data, which corresponds to the at least some bit data programmed in the memory device 150, stored in the data buffer 270 in response to completion of each step program operation. When a read command for obtaining data deleted from the data buffer 270 is input from the external device 150, the controller 130 can perform a read operation on the at least some bit data programmed in a non-volatile memory cell of the memory device 150 even though MSB data is not programmed in the corresponding non-volatile memory cell.

A threshold voltage distribution of non-volatile memory cells in the first non-volatile cell region 292 may change, as a step-by-step program operation is performed on the non-volatile memory cells. As more bit data are programmed into the corresponding non-volatile memory cells, that is, more step program operations for program bit data in the corresponding non-volatile memory cells are completed, the threshold voltage distribution of the non-volatile memory cells is shifted right in a specific direction (e.g., a horizontal axis direction shown in FIG. Referring to FIG. 10, when 3rd bit data is programmed in the non-volatile memory cell, a threshold voltage distribution corresponding to the LSB data may move more right than that when 2nd bit data is stored in the non-volatile memory cell. Accordingly, the memory system 110 may change a level of the read voltage applied for reading data stored in a non-volatile memory cell in response to a program state of the non-volatile memory cell.

Before performing a read operation on bit data programmed in the first non-volatile cell region 292, the controller 130 may check a program state of a non-volatile memory cell included in the first non-volatile cell region 292. According to an embodiment, if a flag indicating a program state of a non-volatile memory cell included in the first non-volatile cell region 292 is stored in the second non-volatile cell region 294 of the memory device 150, the controller 130 may read the flag in the second non-volatile memory cell 294 to recognize the program state of the non-volatile memory cell included in the first non-volatile cell region 292. Hereinafter, embodiments of the present disclosure will be described with reference to FIGS. 11 to 13.

According to an embodiment, when there is no region storing a flag in the memory device 150, the controller 130 can perform an operation for checking a program state of the first non-volatile cell region 292 before performing a read operation in the first non-volatile cell region 292. Herein, a program state check operation may include a check operation (e.g., a status check command operation) for checking an operation state of the memory device 150 including whether a step program operation of a step-by-step (or multi-step) program operation is done. Hereinafter, embodiments of the present disclosure will be described with reference to FIGS. 14 to 18.

Hereinafter, an operation of the above-described memory system will be described in detail with reference to FIGS. 2 to 18. Specifically, a controller included in the memory system will be described with reference to FIGS. 2 to 4, and a non-volatile memory device included in the memory system will be described with reference to FIG. 5. Further, a system and a scheme for programming a plurality of data entries and a parity entry in a memory device will be described with reference to FIGS. 6 to 8.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 2, the memory device 150 may include a plurality of memory blocks 152, 154, 156. The memory blocks 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path, Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIGS. 1 and 2 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell. During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell. During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data entry may be required. The memory device 150 may include a table including information corresponding to plural levels of the read voltage Vrd, corresponding to the multi-bit data entry. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device, e.g., a mobile phone, an MP3 player, a laptop computer, etc., or a non-portable electronic device, e.g., a desktop computer, a game player, a television, a projector, etc.

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility, e.g., a power saving function. The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internet operations of reading data, programming data, erasing data, or the like.

According to an embodiment, the controller 130 may include a host interface 132, a processor 134, the error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 30 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIDI), and the like, According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data entries. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150, Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values, e.g., multiple bit data, approximate values, an analog value, and the like, in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. In the hard decision decoding, a value output from a non-volatile memory cell is decoded as 0 or 1. Compared to the hard decision decoding, the soft decision decoding can determine the value stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code, for example, a Hamming code, in two or three dimensions and repeat decoding in a row direction and a column direction to improve reliability of values.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but may also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130. For example, the memory 144 may temporarily store read data entries output from the memory device 150 in response to a read request from the host 102 before the read data entries are output to the host 102. In addition, the controller 130 may temporarily store write data entries input from the host 102 in the memory 144 before programming the write data entries in the memory device 150, When the controller 130 controls operations, such as a data read operation, a data write or program operation, a data erase operation, etc, of the memory device 150, data transmitted between the controller 130 and the memory device 150 of the memory system 110 may be temporarily stored in the memory 144.

In addition to the read data entries or write data entries, the memory 144 may store information, e.g., map data, read requests, program requests, etc, used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4, According to an embodiment, the processor 134 may be implemented with a microprocessor, a central processing unit (CPU), or the like.

According to an embodiment, the memory system 110 may be implemented with at least one mufti-core processor. The multi-core processor is a type of circuit or chip in which two or more cores, which are considered distinct processing regions, are integrated. For example, when a plurality of cores in the mufti-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Background operations that can be performed without a command transmitted from the host 102 by the controller 130 include garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered to be an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In an embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data, e.g., two or more bits of data. The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use a MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in a MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in a MLC. According to an embodiment, an operation for uniformly levelling threshold voltages of the MLCs may be carried out before another 1-bit data is programmed in the same MLCs, each having stored 1-bit data.

In an embodiment, the memory device 150 is embodied as a non-volatile memory such as a flash memory, for example, a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using a multi-thread scheme included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid. For example, to deter mine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150, e.g., a flash/non-volatile memory, and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and concurrently issue an update request. When the state manager 42 requests the map update in a state in which the copying of the valid page(s) is not completed normally, the map manager 44 may not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
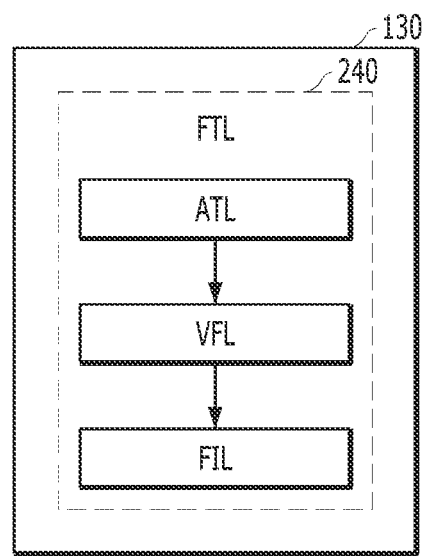
FIG. 4 illustrates internal layers in the controller described with reference to FIGS. 1 to 3 according to an embodiment of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information in which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
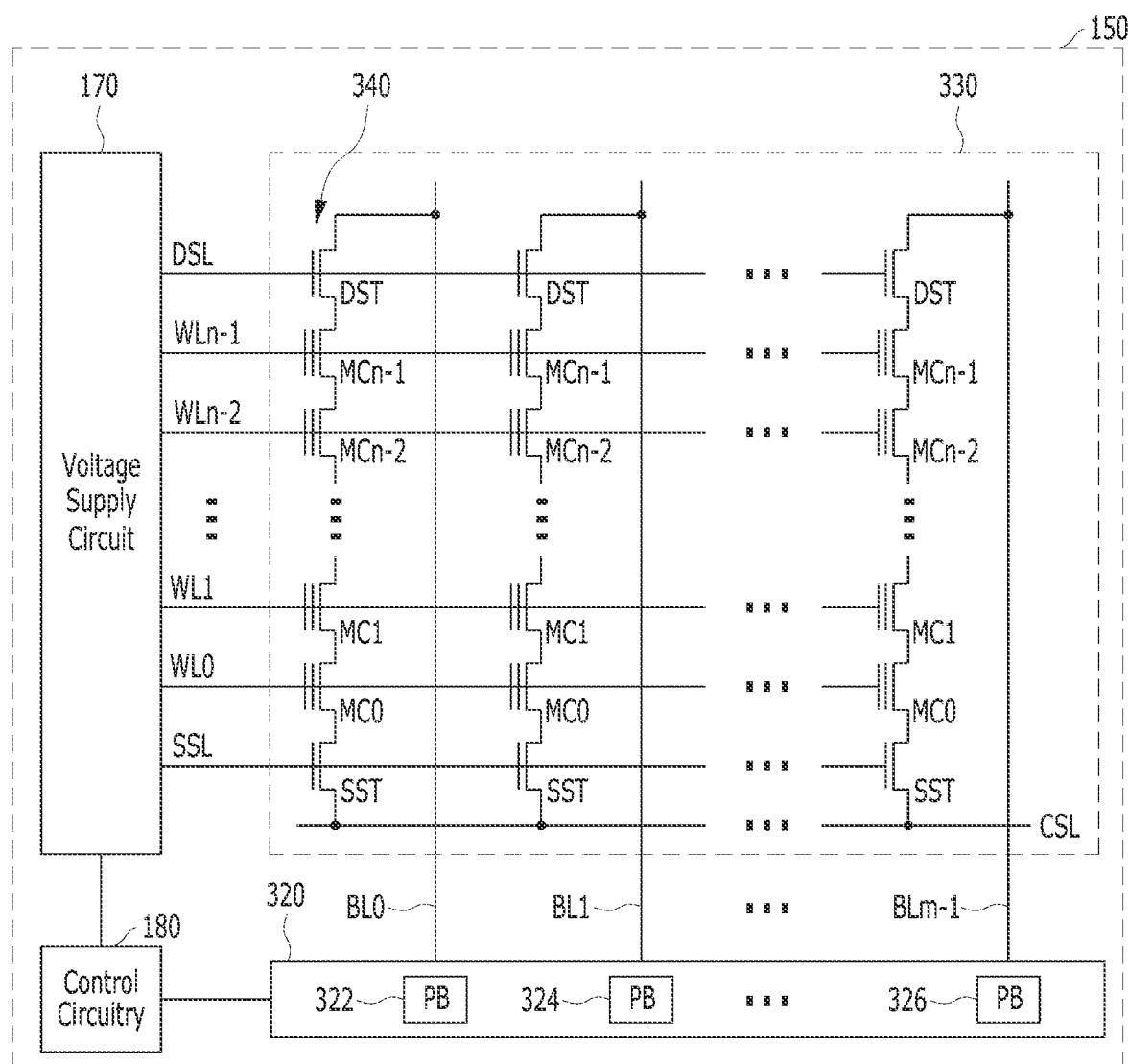
FIG. 5 illustrates a memory device according to an embodiment of the present disclosure.

FIG. 5 illustrates a memory device according to an embodiment of the present disclosure. Specifically, FIG. 5 schematically illustrates a memory cell array circuit in a memory die or memory plane included in the memory device 150 according to an embodiment of the present disclosure.

Referring to FIG. 5, the memory device 150 may include at least one memory group 330 having a plurality of cell strings 340. Each cell string 340 may include a plurality of non-volatile memory cells MC0 to MCn−1 connected to a respective bit line of a plurality of bit lines BL0 to BLm−1. The cell strings 340 are disposed in respective columns of the memory group 330, and each cell string 340 can include at least one drain select transistor DST and at least one source select transistor SST. The non-volatile memory cells MC0 to MCn−1 of each cell string 340 may be connected in series between a drain select transistor DST and a source select transistor SST. Each of the non-volatile memory cells MC0 to MCn−1 may be configured as a mufti-level cell (MLC) that stores a data entry having plural bits per cell. The cell strings 340 may be electrically connected to corresponding bit lines of the bit lines BL0 to BLm−1.

In the embodiment shown in FIG. 5, the memory group 330 may include NAND-type flash memory cells MC0 to MCn−1. In another embodiment, the memory group 330 can be implemented as a NOR-type flash memory, a hybrid flash memory in which at least two different types of memory cells are mixed or combined, or a one-chip NAND flash memory in which a controller is embedded in a single memory chip. In an embodiment, the memory group 330 can include a flash memory cell including a charge trap flash (CTF) layer that includes a conductive floating gate or insulating layer.

FIG. 5 shows an embodiment of a memory system 110 which may include the memory device 150. In this embodiment, the memory group 330 in memory device 150 may include one or more memory blocks 152, 154, 156. According to an embodiment, the memory device 150 can have a two-dimensional (2D) or three-dimensional (3D) structure. For example, each of the memory blocks 152, 154, 156 in the memory device 150 may be implemented as a 3D structure or a vertical structure. Each of the memory blocks 152, 154, 156 may have a three-dimensional structure extending along first to third directions, for example, an x-axis direction, a y-axis direction, and a z-axis direction.

The memory group 330 including the plurality of memory blocks 152, 154, 156 can be coupled to a plurality of bit lines BL, a plurality of string select lines SSL, and a plurality of drain select lines DSL, a plurality of word lines WL, a plurality of dummy word lines DWL, and a plurality of common source lines CSL. In an embodiment, the memory group 330 can include a plurality of NAND strings NS which, for example, may respectively correspond to cell strings 340. Each NAND string NS may include a plurality of memory cells MC and may be connected to a respective bit line of the bit lines BL. In addition, the string select transistor SST of each NAND string NS may be connected to a common source line CSL, and the drain select transistor DST of each NAND string NS can be connected to a corresponding bit line BL. In each NAND string NS, the memory cells MC may be arranged between the string select transistor SST and the drain select transistor DST.

Referring to FIG. 5, the memory device 150 can include a voltage supply circuit 170 which can supply a word line voltage, e.g., one or more predetermined voltages such as a program voltage, a read voltage, and a pass voltage, for respective word lines according to an operation mode, or may supply a voltage to a bulk (e.g., a well region) in which each memory block including the memory cells MC are formed. In this case, a voltage generating operation of the voltage supply circuit 170 may be performed under a control of a control circuitry 180. Also, the voltage supply circuit 170 may generate a plurality of variable read voltages to distinguish a plurality of data entries from each other. The plurality of variable read voltages can be applied to non-volatile memory cells in the memory group 330.

In response to the control of the control circuit, one of the memory blocks (or sectors) of the memory cell array may be selected, and one of the word lines of the selected memory block may be selected. Word line voltages may be supplied to the selected word line and the unselected word line, individually. The voltage supply circuit 170 may include a voltage generation circuit (e.g., refer to FIGS. 6 to 8) for generating target voltages having various levels.

In an embodiment, the voltage supply circuit 170 may be coupled to a first pin or pad receiving a first power voltage VCC applied from the outside (e.g., an external device) and a second pin or pad receiving the second power voltage VPP applied from the external device. The second power voltage VPP may have a greater voltage level, e.g., twice or more higher than that of the first power voltage VCC. For example, the first power voltage VCC may have a voltage level of 2.0 V to 5.5 V, while the second power supply voltage may have a voltage level of 9 V to 13 V.

According to an embodiment, the voltage supply circuit 170 can include a voltage generation circuit for more rapidly generating the target voltages of various levels used in the memory group 330. The voltage generation circuit can use the second power supply voltage VPP to generate a target voltage, which may have a higher voltage level than the second power voltage VPP.

The memory device 150 may also include a read/write circuit 320 controlled by the control circuitry 180. The read/write circuit 320 may operate as a sense amplifier or a write driver according to an operation mode. For example, in a verify operation and a read operation, the read/write circuit 320 may operate as a sense amplifier for reading the data entry from the memory cell array. In a program operation, the read/write circuit 320 may operate as a write driver that controls potentials of bit lines according to a data entry to be stored in the memory cell array. The read/write circuit 320 may receive the data entry to be programmed to the cell array from page buffers during the program operation. The read/write circuit 320 can drive bit lines based on the input data entry. To this end, the read/write circuit 320 may include a plurality of page buffers (PB) 322, 324, 326, with each page buffer corresponding to each column (or each bit line) or each column pair (or each bit line pair). According to an embodiment, a plurality of latches may be included in each of the page buffers 322, 324, 326.

The page buffers 322, 324, 326 may be coupled to a data input/output device (e.g., a serialization circuit or a serializer) through a plurality of buses BUS. When each of the page buffers 322, 324, 326 is coupled to the data input/output device through different buses, a delay that may occur in data transmission from the page buffers 322, 324, 326 can be reduced. For example, each page buffer 322, 324, 326 can perform the data transmission without a waiting time. According to an embodiment, the input/output device can be included in an input/output control circuit 380 described with reference to FIG. 6. Further, the page buffers 322, 324, 326 described with reference to FIG. 5 can include a data register 254 described with reference to FIG. 6.

According to an embodiment, the memory device 150 may receive a write command, write data entries, and information (e.g., a physical address) regarding a location in which the write data entries are to be stored. The control circuitry 180 causes the voltage supply circuit 170 to generate a program pulse, a pass voltage, etc., used for a program operation performed in response to a write command, and to generate one or more voltages used for a verification operation performed after the program operation.

When a multi-bit data entry is programmed in non-volatile memory cells included in the memory group 330, the error rate may be higher than that when a single-bit data entry is stored in the non-volatile memory cells. For example, an error in the non-volatile memory cells may be induced due to cell-to-cell interference (CCI). In order to reduce error in the non-volatile memory cells, a width (deviation) of a threshold voltage distribution corresponding to stored data entries between the non-volatile memory cells, should be reduced.

To this end, the memory device 150 can perform an incremental step pulse programming (ISPP) operation to effectively make a narrow threshold voltage distribution of the non-volatile memory cells. In an embodiment, the memory device 150 can use the ISPP operation for multi-step program operations. For example, the memory device 150 may divide a program operation into a Least Significant Bit (LSB) program operation and a Most Significant Bit (MSB) operation according to a predetermined order between the non-volatile memory cells or pages.

Figure 6:
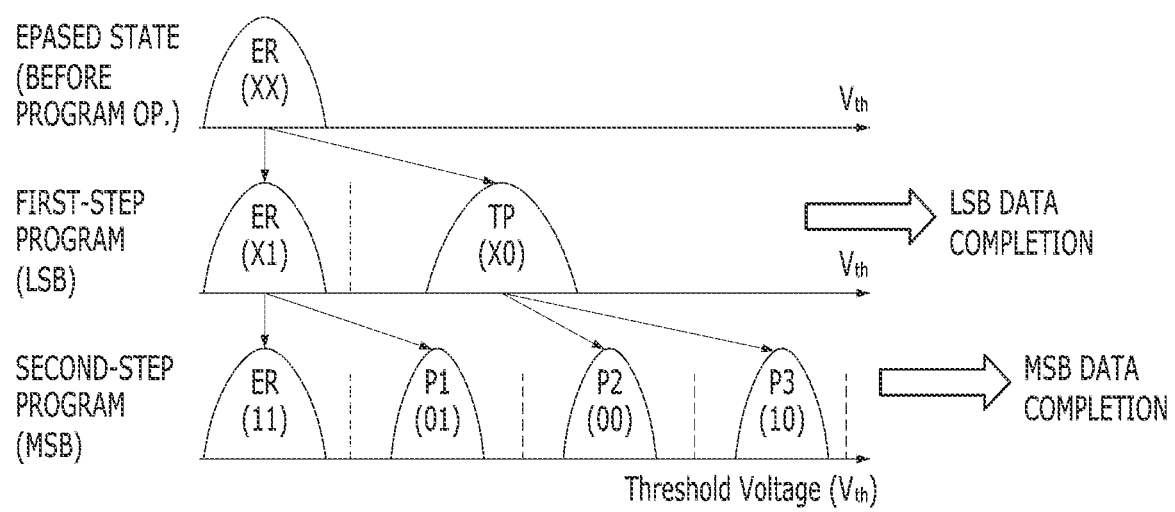
FIG. 6 illustrates a first example of programming multi-bit data in a non-volatile memory cell according to an embodiment of the present disclosure.

FIG. 6 illustrates a first example of programming multi-bit data in a non-volatile memory cell according to an embodiment of the present disclosure. FIG. 6 illustrates a two-step program operation for programming 2-bit data in the non-volatile memory cell.

Referring to FIG. 6, prior to a data program operation, a non-volatile memory cell may have a threshold voltage corresponding to an erased state. When a first-step program operation is performed, LSB data may be programmed into the non-volatile memory cell. Thereafter, when a second-step program operation is performed, MSB data may be programmed into the non-volatile memory cell. Through a first-step program operation and a second-step program operation, a threshold voltage of the non-volatile memory cell could belong to one of four different states ER, P1, P2, P3. Four different threshold voltage states ER, P1, P2, P3 of non-volatile memory cells can correspond to different 2-bit data '11', '01', '00', '10'.

The memory device 150 might take a long time to program multi-bit data in non-volatile memory cells because of various reasons such as limitation of resources, interrupt or latency, power issue, or the like. As described with reference to FIGS. 1 and 6, when the first-step program operation is completed, the memory device 150 may notify the completion of the LSB data (LSB DATA COMPLETION) to the controller 130. Thereafter, the memory device 150 may program the MSB data in non-volatile memory cells, which have been programmed with the LSB data, through a second-step program operation. When the second-step program operation is completed, the memory device 150 may send a completion notification for the MSB data (MSB DATA COMPLETION) to the controller 130.

Figure 7:
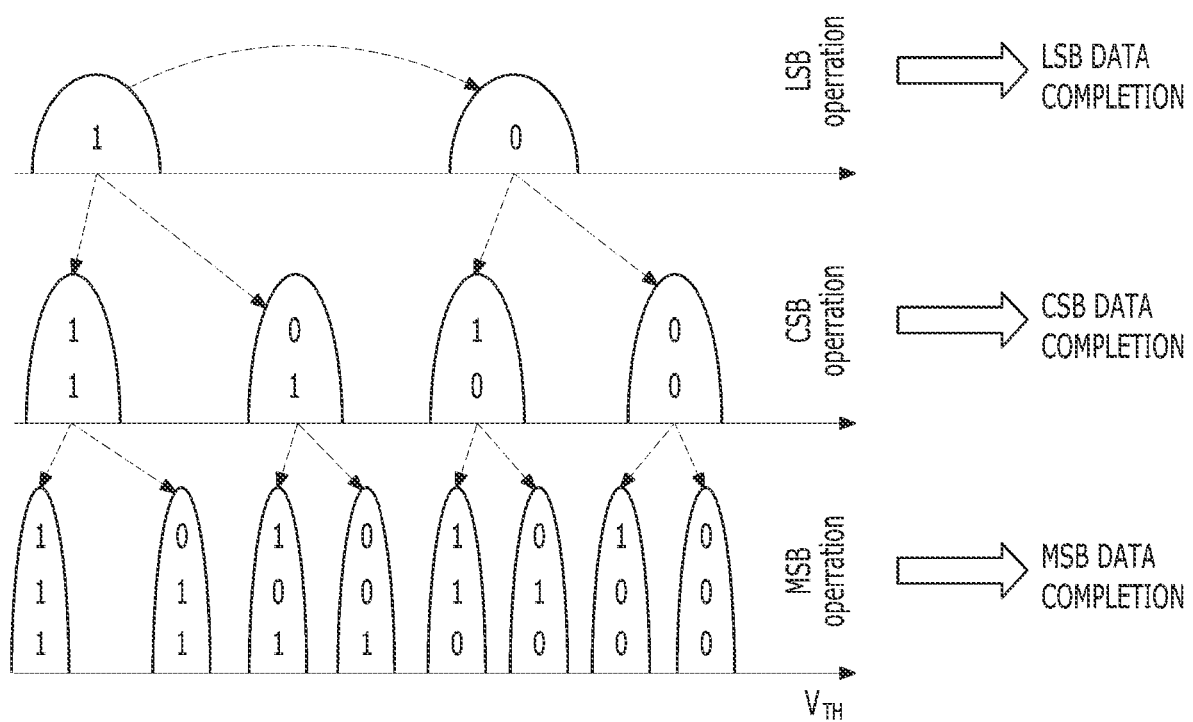
FIG. 7 illustrates a second example of programming multi-bit data in a non-volatile memory cell according to an embodiment of the present disclosure.

FIG. 7 illustrates a second example of programming multi-bit data in a non-volatile memory cell according to an embodiment of the present disclosure, FIG. 7 illustrates a three-step program operation for programming 3-bit data in the non-volatile memory cell.

Prior to a data program operation, non-volatile memory cells may have a threshold voltage corresponding to an erased state shown in FIG. 6. Referring to FIG. 7, when a first-step program operation is performed, LSB data may be programmed into the non-volatile memory cells. Thereafter, when a second-step program operation is performed, CSB data may be programmed into the non-volatile memory cells which have been programmed with the LSB data. Thereafter, MSB data may be programmed into the non-volatile memory cells through a third-step program operation. Through the first-step program operation to the third-step program operation, threshold voltages of the non-volatile memory cells may belong to eight different threshold voltage states. Eight different threshold voltage states of the non-volatile memory cells correspond to three-bit data (e.g., '111', '011', '101', '001', '110', '010', '100', '000').

The memory device 150 may take a long time to store multi-bit data through the three-step program operation. Referring to FIGS. 1 and 7, when the first-step program operation is completed, the memory device 150 may notify program completion regarding LSB data (LSB DATA COMPLETION) to the controller 130. Thereafter, the memory device 150 may program CSB data through a second-step program operation. When the second-step program operation is completed, the memory device 150 may notify program completion of CSB data (CSB DATA COMPLETION) to the controller 130. Thereafter, the memory device 150 may program the MSB data through a third-step program operation. When the third-step program operation is completed, the memory device 150 may provide a completion notification for the MSB data (MSB DATA COMPLETION) to the controller 130.

Although it is described in FIG. 7 that 3-bit data is programmed in a non-volatile memory cell through a three-step program operation, 3-bit data may be programmed through a two-step program operation according to an embodiment. In a case of programming the 3-bit data through a two-step program operation, the memory device 150 may transfer, to the controller 130, completion of the LSB data after the first-stage program and completion of the CSB data and MSB data after the second-stage program.

According to an embodiment, the controller 130 may delete or erase some of the write data stored in the data buffer 270 (refer to FIG. 1) based on completion notification transferred from the memory device 150. Through this, the memory system 110 may increase the utilization of internal resources.

Referring to FIG. 7, the 3-bit data programmed in the non-volatile memory may include the LSB (Least Significant Bit) data, the CSB (Central Significant Bit) data, and the MSB (Most Significant Bit) data, which individually correspond to lower, middle, and upper bits. For example, the controller 130 can program three-page data in a group of non-volatile memory cells connected to a single word line. The three-page data correspond to respective lower, middle, and upper bit of each non-volatile memory cell. The three-page data can include LSB page data, CSB page data, and MSB page data.

Figure 8:
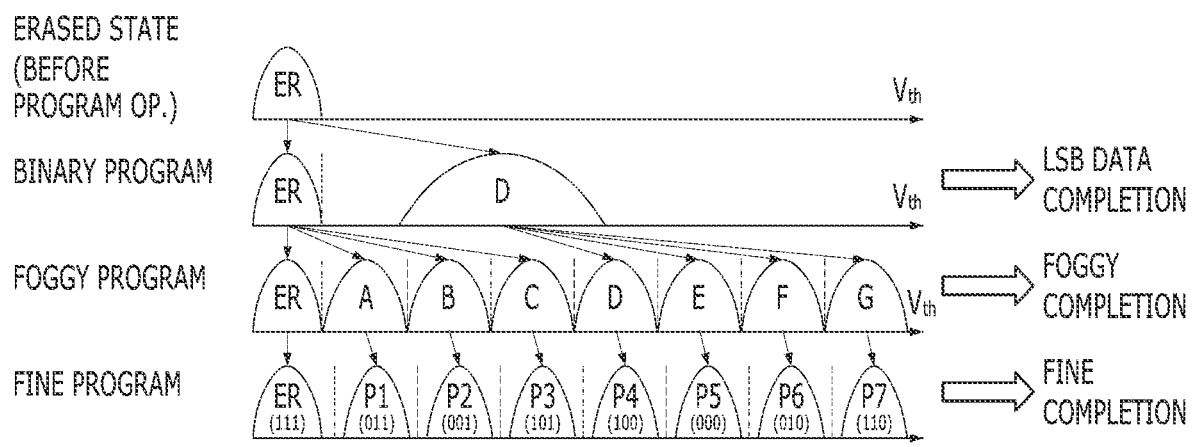
FIG. 8 illustrates a third example of programming multi-bit data in a non-volatile memory cell according to an embodiment of the present disclosure.

FIG. 8 illustrates a third example of programming multi-bit data in a non-volatile memory cell according to an embodiment of the present disclosure. FIG. 8 illustrates another three-step program operation for storing 3-bit data in the non-volatile memory cell. Referring to FIG. 8, prior to a data program operation, a non-volatile memory cell may have a threshold voltage corresponding to an erased state. The memory device 150 may perform a partial program operation based on LSB data stored in nonvolatile memory cells. Here, the partial program operation may include a binary program operation for greatly increasing a threshold voltage of the non-volatile memory cell based on the LSB data by applying a big ISPP step pulse. After performing the binary program operation, the memory device 150 can provide a completion notification for LSB data (LSB DATA COMPLETION) to the controller 130

After the binary program operation, the memory device 150 may program the non-volatile memory cell based on CSB and MSB data. In this step, the threshold voltage of the non-volatile memory cells may be increased based on an ISPP step pulse smaller than (e.g., either applying a lower-level pulse or applying same level pulse for a shorter time) that of binary program operation. This process may be referred to as a foggy program operation. Thereafter, the memory device 150 may perform a fine program operation to narrow a width of threshold voltage distribution regarding the non-volatile memory cells. A fine program operation can use smaller ISPP step pulses than that of the foggy program operation.

Unlike the binary program operation or the foggy program operation, the fine program operation is performed for narrowing a width of a plural threshold voltage distribution regarding the non-volatile memory cells. During the fine program operation, a possibility of errors may increase. Accordingly, the memory device 150 can store the programmed bit data (all bit values) in a SLC buffer even after the binary program operation and the foggy program operation are done. According to an embodiment, the memory device 150 may notify completion of the foggy program operation (FOGGY COMPLETION) to the controller 130 after the foggy program operation is done. Also, the memory device 150 transfers a completion notification of the fine program operation (FINE COMPLETION) to the controller 130 after the fine program.

As described above, referring to FIGS. 6 to 8, a procedure of storing mufti-bit data in the memory device 150 may be performed through a plurality of step program operations, and the memory device 150 can output a completion notification when each step program operation is completed. The controller 130 may erase or delete data stored in the data buffer 270, shown in FIG. 1, based on the completion notification transferred from the memory device 150.

According to an embodiment, a flag stored in the second non-volatile memory region 294 described with reference to FIG. 1 may be programmed similarly to write data programmed in the first non-volatile memory region 294. In a case of multi-bit data stored in the first non-volatile memory region 292, the controller 130 may detect and correct an error through the error correction circuitry 138 illustrated in FIG. 2. However, a flag is a type of information that indicates a program state rather than data or information processed through an error correction mechanism based on an error correction code. Thus, the flag is not checked or processed by the error correction circuitry 138 to detect and correct an error included in the flag.

Figure 9:
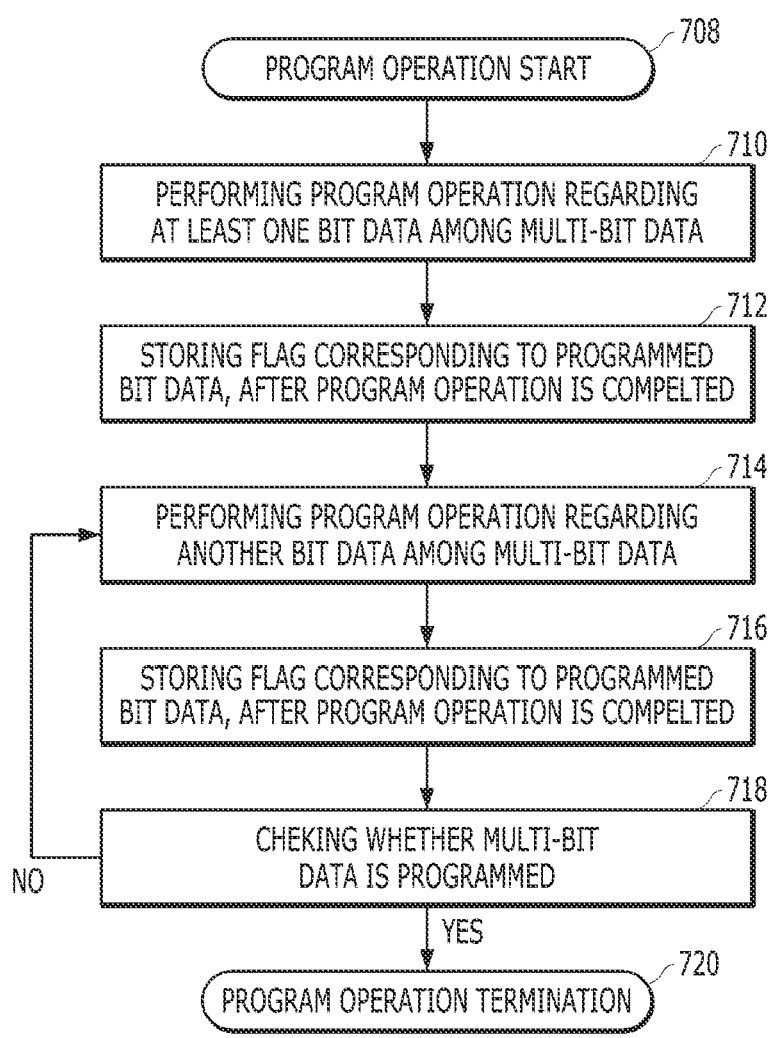
FIG. 9 illustrates a first example of a program operation performed within a memory system according to another embodiment of the present disclosure.

FIG. 9 illustrates a first example of a program operation performed within a memory system according to another embodiment of the present disclosure.

Referring to FIG. 9, a program operation procedure can be started by a write command and write data input from an external device (e.g., the host 102 shown in FIGS. 2 to 3), or an internal operation performed by the controller 130 (e.g., garbage collection, wear leveling, data migration, etc.) (operation 708).

A non-volatile memory cell included in the first non-volatile memory region 292 of the memory device 150 may store multi-bit data. The mufti-bit data stored in the non-volatile memory cell may be programmed in an order of LSB data to MSB data. The mufti-bit data may be stored in the non-volatile memory cell through at least two step program operations or a multi-step program operation corresponding to the number of bits of the multi-bit data.

When the program operation starts (operation 708), the memory system 110 may perform a step program operation on at least one bit data among the multi-bit data (operation 710). Herein, the step program operation corresponding to at least one bit data may include a program operation on LSB data stored in non-volatile memory cells.

After bit data is programmed in the non-volatile memory cells in the first non-volatile memory region 292 (operation 710), the memory system 110 may store a flag corresponding to the programmed bit data (operation 712). According to an embodiment, the memory system 110 may store the flag information in the second non-volatile memory region 294 corresponding to the non-volatile memory cells in the first non-volatile memory region 292.

The memory system 110 may continue the step-by-step program operation until the multi-bit data is programmed into the non-volatile memory cell. The memory system 110 may perform another step program operation on another bit data among the mufti-bit data (operation 714). After the step program operation on another bit data, the memory system 110 can update or store the flag corresponding to the programmed bit data (operation 716).

The memory system 110 may check whether ail of the multi-bit data is programmed (operation 718). According to an embodiment, the non-volatile memory cell can be programmed with multi-bit data in an order of LSB data to MSB data. The memory system 110 can check whether the MSB data is programmed in the non-volatile memory cell to determine whether the non-volatile memory cell is programmed with the mufti-bit data.

When all of the mufti-bit data is not programmed (NO in the operation 718), the memory system 110 can perform another step program operation on another bit data among the multi-bit data (operation 714). When all of the multi-bit data is programmed (YES in the operation 718), the memory system 110 may terminate the program operation procedure (operation 720).

Figure 10:
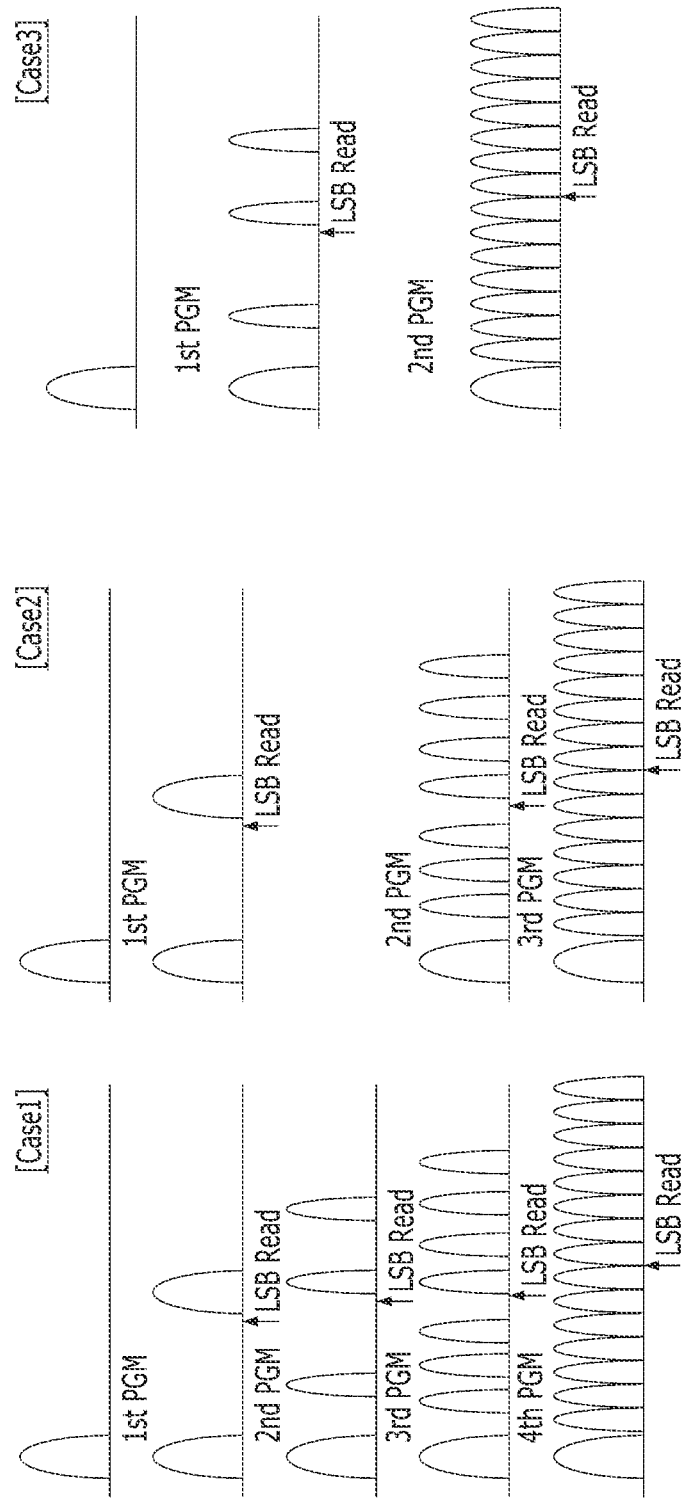
FIG. 10 illustrates a level change in a read voltage regarding LSB data according to a program state of a non-volatile memory cell according to an embodiment of the present disclosure.

FIG. 10 illustrates a level change in a read voltage regarding LSB data according to a program state of a non-volatile memory cell according to an embodiment of the present disclosure. Specifically, FIG. describes changes of threshold voltage distribution according to three different program methods of multi-bit data.

In a first programming method (Case1), each bit data among the multi-bit data is programmed step-by-step. In the non-volatile memory cell having a state in which data is erased, LSB data may be programmed by a first step program operation (1st PGM). Thereafter, second bit data may be programmed in the non-volatile memory cell, which has been programmed with the LSB data, through a second step program operation (2nd PGM). Through a third step program operation (3rd PGM), third bit data may be programmed in the non-volatile memory cell programmed with the second bit data. Fourth bit data (i.e., MSB data) may be programmed in the non-volatile memory cell, which is programmed with the third bit data, through the fourth program operation (4th PGM). In the first program method (Case1) shown in FIG. 10, 4-bit data can be stored in a non-volatile memory cell as an example, but the number of bits of the multi-bit data stored in each non-volatile memory cell may vary according to an embodiment.

Referring to FIG. 10, a threshold voltage distribution associated with the LSB data is shifted or changed whenever a step program operation is performed through the first program method (Case1). Typically, after all multi-bit data is programmed, the memory device 150 applies a read voltage (LSB data Read) for reading the LSB data from a non-volatile memory cell. However, because the threshold voltage distribution for the LSB data can be varied before all of the multi-bit data is programmed, the read voltage (LSB Read) for reading the LSB data before all of the multi-bit data is programmed should be changed based on a program state of the non-volatile memory cell. If a level of the read voltage is not changed, many errors can occur in the non-volatile memory cells, so that it may be difficult to accurately read the LSB data from the non-volatile memory cells. Although it has been described that the level of the read voltage for obtaining the LSB data is adjusted in FIG. 10, the memory system 110 can change a level of the read voltage for obtaining bit data other than the LSB data.

In a second programming method (Case2), LSB data and MSB data among the multi-bit data are programmed by a separate step program operation, and plural bit data between the LSB data and the MSB data could be programmed at once. In the non-volatile memory cell having a state in which data is deleted or erased, the LSB data may be programmed by a first step program operation (1st PGM). Thereafter, the plural bit data may be programmed into the non-volatile memory cell in which the LSB data is programmed through a second step program operation (2nd PGM). The MSB data may be programmed in the non-volatile memory cell in which the plural bit data is programmed through a third step program operation (3rd PGM), In the second program method (Case2) of FIG. 10, a case in which 4-bit data can be stored in the non-volatile memory cell is described as an example, but the number of bits of multi-bit data stored in the non-volatile memory cell may be different according to an embodiment.

In a third programming method (Case3), two-bit data among multi-bit data can be programed step-by-step. In the non-volatile memory cell having a state in which data is deleted or erased, two-bit data including LSB data may be programmed by a first step program operation (1st PGM). Thereafter, another two-bit data including MSB data may be programmed into the nonvolatile memory cell, which have been programmed with the two-bit data including the LSB data, through a second step program operation (2nd PGM). In the third programming method (Case3) of FIG. 10, a case in which 4-bit data can be stored in the non-volatile memory cell is described as an example, but the number of bits of multi-bit data programmed in each non-volatile memory cell may vary according to an embodiment.

Even when the multi-bit data is programmed into a non-volatile memory cell through the second program method (Case 2) and the third program method (Case3) like the first program method (Case1), the threshold voltage distribution corresponding to the LSB data can be shifted or changed. The memory system 110 may change a level of the read voltage for obtaining the LSB data in response to the change in the threshold voltage distribution regarding the nonvolatile memory cells. Through this method, the memory system 110 may accurately read the LSB data programmed in the non-volatile memory cell even before MSB data is programmed therein. Referring to FIGS. 6 to 8, LSB data or CSB data may be stored in a specific memory cell before MSB data is programmed in the corresponding memory cell. For example, after the LSB data or the CSB data is programmed in a specific memory cell before the MSB data is programed therein, the controller 130 may read the LSB data or the CSB data programmed in the corresponding memory cell. Also, the controller 130 may read the LSB data or CSB data stored in the corresponding memory cell before formation of the threshold voltage distribution corresponding to the multi-bit data including the MSB data is completed. Accordingly, the memory system 110 can release or delete some programmed bit data from the data buffer 270 shown in FIG. 1, before the corresponding memory cell is completely programed with the multi-bit data.

Figure 11:
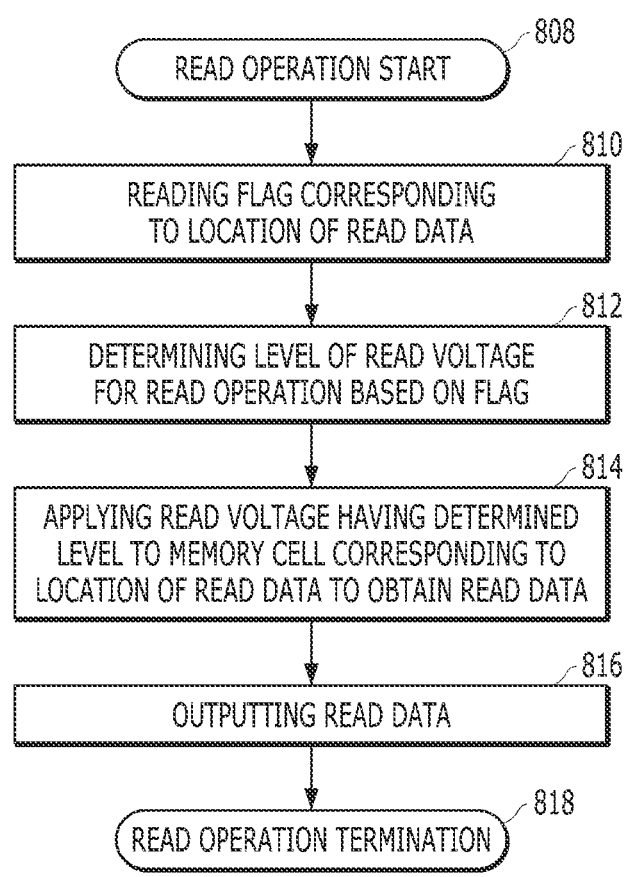
FIG. 11 illustrates a first example of a read operation performed within a memory system according to another embodiment of the present disclosure.

FIG. 11 illustrates a first example of a read operation performed within a memory system according to another embodiment of the present disclosure.

Referring to FIGS. 1 and 11, the first non-volatile cell region 292 in the memory device 150 may store multi-bit data, and the second non-volatile cell region 294 may store a flag.

Referring to FIG. 11, the read operation may be performed by the controller 130 for obtaining data stored in the memory device 150 (operation 808). Typically, after a non-volatile memory cell included in the memory device 150 is programmed with the multi-bit data, the controller 130 may try to read the multi-bit data programmed in the corresponding non-volatile memory cell. However, in an embodiment of the present disclosure, the controller 130 may perform a read operation on a non-volatile memory cell having a program state in which MSB data is not programmed.

When the read operation is started (operation 808), the memory system 110 can read a flag corresponding to a location of read data (operation 810). Because the flag cell indicates a program state of a non-volatile memory cell storing the read data, the memory system 110 can set or adjust a level of a read voltage for reading the non-volatile memory cell to perform a read operation based on the flag (operation 812). As shown in FIG. 10, a threshold voltage distribution corresponding to bit data stored in non-volatile memory cells may vary according to the program state (e.g., how many bit data is programmed therein), and the level of the read voltage should be adjusted or changed in response to the program state to avoid an error of the read data which corresponds to bit data programmed in the non-volatile memory cell. For example, the memory system 110 can select the level of the read voltage from a preset read voltage table according to the flag, calculate or determine the level of the read voltage by applying the flag into a preset arithmetic expression, or the like.

When the level of the read voltage is determined (operation 812), the memory system 110 may apply the read voltage having the determined level to the non-volatile memory cell corresponding to the location of the read data to perform a read operation (operation 814). After performing a read operation on the non-volatile memory cell (operation 814), the memory system 110 may output the read data obtained through the read operation (operation 816). Here, the read data may be transferred from the memory device 150 to the controller 130. According to an embodiment, when a read operation is performed in response to a read command input from the external device, the controller 130 may output the read data to the external device. When the read data is output (operation 816), the memory system 110 may terminate the read operation (operation 818).

Figure 12:
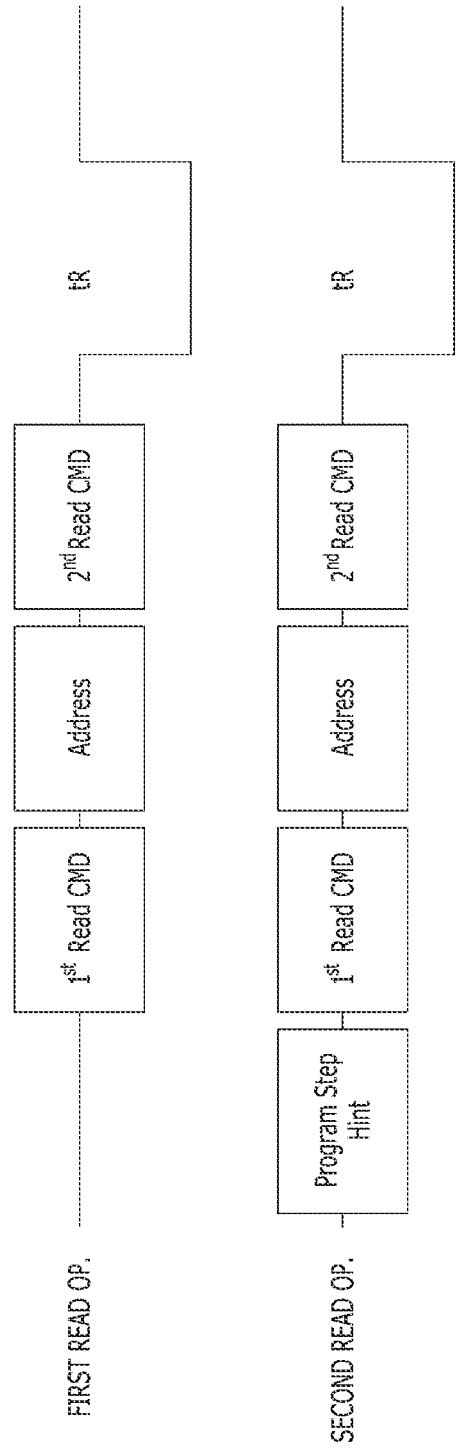
FIG. 12 illustrates an operation margin for the read operation shown in FIG. 11 according to an embodiment of the present disclosure.

FIG. 12 illustrates an operation margin for the read operation shown in FIG. 11 according to an embodiment of the present disclosure.

Referring to FIG. 12, two different read operations performed by the memory system 110 will be described. First, a first read operation (FIRST READ OP.) may be performed when all of the multi-bit data is programmed in a non-volatile memory cell included in the memory device 150. The controller 130 may transmit a first read command ($1^{st}$ Read CMD), an address of the non-volatile memory cell, and a second read command (2nd Read CMD) to the memory device 150. In this case, the address of the non-volatile memory cell may include a physical address converted by the flash translation layer 240 in the controller 130. The memory device 150 may output read data obtained from the non-volatile memory cell in response to the read command and the address during a read operation margin tR.

Moreover, a third read operation (THIRD READ OP.) may be performed when all multi-bit data is not programmed in a non-volatile memory cell included in the memory device 150. Unlike the first read operation (FIRST READ OP.), the third read operation (THIRD READ OP.) includes an additional operation (Additional CMD & ADD cycle) for reading a flag in the memory device 150 before transmission of a first read command (1st Read CMD), an address of a nonvolatile memory cell, and a second read command (2nd Read CMD). Here, the additional operation (Additional CMD & ADD cycle) can include transmitting a read command (Additional CMD) and an address of the flag, which is used for the controller 130 to determine a program state of the non-volatile memory cell that is a target of the third read operation (THIRD READ OP.), to the memory device 150, and outputting, by the memory device 150, information on the flag to the controller 130.

Figure 13:
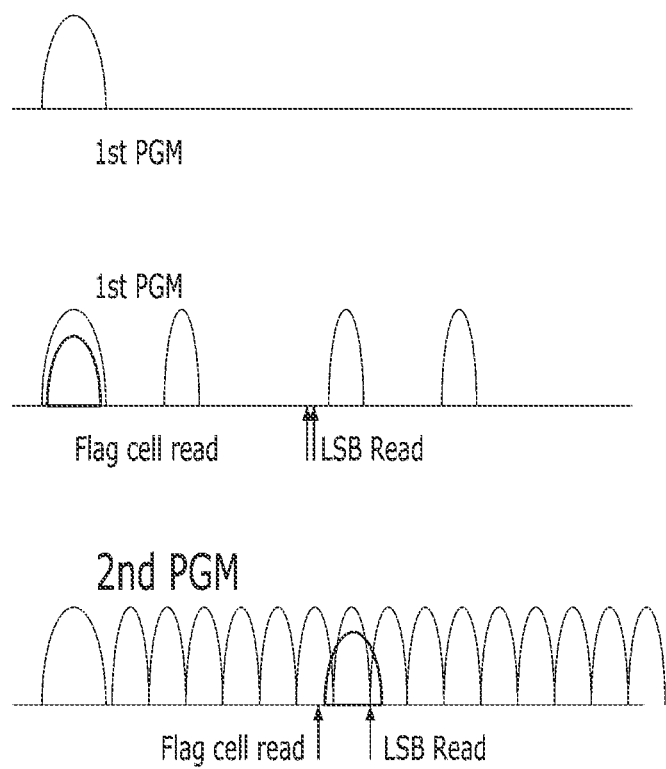
FIG. 13 illustrates a read voltage having a level determined in response to a flag according to an embodiment of the present disclosure.

FIG. 13 illustrates a read voltage having a level determined in response to a flag according to an embodiment of the present disclosure.

Referring to FIG. 13, an example in which 4-bit data is programmed in a non-volatile memory cell in the memory device 150 through a two-step program operation will be described. The non-volatile memory cell may be programmed similar to the third program method (Case3) shown in FIG. 10. The non-volatile memory cell programmed with the 4-bit data through the two-stage program operation may have one of three program states. A first program state is an erased state (ERASED STATE) in which data of the non-volatile memory cell is erased. A second program state is a state in which some bit data (i.e., 2-bit data among the 4-bit data) is programmed through a first step program operation (1st PGM) performed on the non-volatile memory cell. The 2-bit data programmed therein can include LSB data. A third program state is a state in which all of the 4-bit data from the LSB data to MSB data is programmed in the non-volatile memory cell by a second step program operation (2nd PGM).

In an embodiment, when the first step program operation (1st PGM) is performed on non-volatile memory cells, four threshold voltage distributions corresponding to the two-bit data including LSB data can be generated. According to an embodiment, some of the non-volatile memory cells programmed with a specific bit data can be used as the flag. The flag may show a current program state regarding the non-volatile memory cells. For example, a threshold voltage distribution corresponding to the erased state (e.g., data of '1' and '11') can be used as the flag. Comparing before and after the first step program operation (1st PGM), a width of the threshold voltage distribution (e.g., data of '11') after the first step program operation (1st PGM) may be narrower than that (e.g., data of '1') before the first step program operation (1st PGM) is performed. If it is determined that the width of the threshold voltage distribution used as the flag is narrowed, the memory system 110 may recognize that the first step program operation (1st PGM) has been performed on the non-volatile memory cells.

When it is recognized that the first step program operation (1st PGM) has been performed on the non-volatile memory cells based on the check operation for the flag, the memory system 110 can change or adjust a level of the read voltage (LSB Read) applied for reading the LSB data based on the flag.

After the second step program operation (2nd PGM) is performed on the non-volatile memory cells which has been programmed with the 2-bit data including the LSB data, the flag may also be updated or changed. Referring to FIG. 13, another threshold voltage distribution corresponding to another value (e.g., data of '00' and '0000') can be used as the flag. Comparing before and after the second step program operation (2nd PGM), a width of the threshold voltage distribution (e.g., data of '0000') after the second step program operation (2nd PGM) may be narrower than that (e.g., data of '00') before the second step program operation (2nd PGM) is performed. The memory system 110 may recognize that the second stage program operation (2nd PGM) is completed in the non-volatile memory cells based on the change of the threshold voltage distribution used as the flag, so that a level of the read voltage (LSB Read) applied for reading the LSB data can be changed or adjusted corresponding to the program state of the non-volatile memory cells.

Referring to FIG. 13, according to another embodiment, additional flag memory cells configured to store a single-bit data can be used to store a flag. For example, unlike the non-volatile memory cells storing the 4-bit data, a non-volatile memory cell included in an SLC memory block in the memory device 150 may be used as a flag cell. After the first step program operation (1st PGM) is performed on the non-volatile memory cells, data of '1' is programmed into the flag memory cells. If the data of '1' is programmed in the flag memory cells, a width of threshold voltage distribution corresponding to the data of '1' may be narrowed compared to the erased state. Further, after the second stage program operation (2nd PGM) is performed on the non-volatile memory cells, data of '0' is programmed into the flag memory cells. If the data of '0' is programmed in the flag memory cells, the threshold voltage distribution of the flag memory cells may shift to the right. Accordingly, a configuration of the flag memory cells and a method of storing a program state regarding the non-volatile memory cells in the flag memory cells may be different according to how the memory system 110 or the memory device 150 programs multi-bit data in the non-volatile memory cells.

Figure 14:
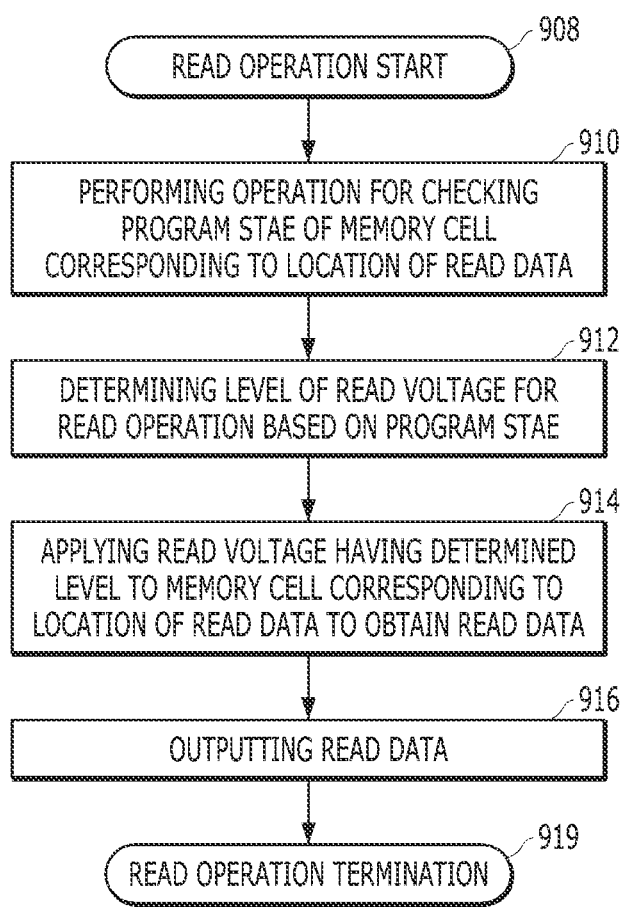
FIG. 14 illustrates a second example of a read operation performed within a memory system according to another embodiment of the present disclosure.

FIG. 14 illustrates a second example of a read operation performed within a memory system according to another embodiment of the present disclosure. FIG. 14 shows another embodiment in which both the first non-volatile cell region 292 and the second non-volatile cell region 294 in the memory device 150 are used to store a data entry and there is no additional flag separately stored.

Referring to FIG. 14, the read operation may be performed by the controller 130 for reading the data entry stored in the memory device 150 (operation 908). Typically, after non-volatile memory cells included in the memory device 150 are programmed with multi-bit data, the controller 130 may try to perform a read operation for reading the multi-bit data programmed in the non-volatile memory cells. However, the controller 130 can perform the read operation for reading some bit data among the multi-bit data from the non-volatile memory cells even when the non-volatile memory cells included in the memory device 150 are fully programmed with the multi-bit data.

When a read operation starts (operation 908), the memory system 110 may perform an operation for checking a program state regarding non-volatile memory cells corresponding to a location of read data (operation 910). For example, the memory device 150 or the controller 130 may store status information indicating whether a step program operation performed on the non-volatile memory cells corresponding to the location of the read data is completed. To this end, according to an embodiment, the memory device 150 or the controller 130 may further include a component such as a register for storing the program state. According to an embodiment, the memory device 150 or the controller 130 can store or update operation information or status information about a memory die or a memory plane and may store the operation information or the status information including whether a step-by-step program operation is completed or not. The memory system 110 may estimate or recognize the program state regarding the non-volatile memory cells to which a read operation is to be performed by utilizing the status information (e.g., a program operation result, page/block information) regarding the nonvolatile memory cell.

The memory system 110 may set or adjust a level of a read voltage according to a program state estimated or recognized as a check operation (operation 912). As described with reference to FIG. a threshold voltage level of a non-volatile memory cell may be shifted or changed according to programmed bit data whenever a step program operation is performed on the non-volatile memory cell, Threshold voltage distributions corresponding to bit data stored in the non-volatile memory cells may vary according to a program state of the non-volatile memory cells. Accordingly, the level of the read voltage should be adjusted or changed in response to the program state to reduce errors in the bit data read or obtained from the non-volatile memory cells.

When the level of the read voltage is determined (operation 912), the memory system 110 may apply the read voltage having the determined level to the non-volatile memory cells corresponding to a location of the read data for performing the read operation (operation 914). After performing a read operation on the non-volatile memory cells (operation 914), the memory system 110 may output the read data obtained through the read operation (operation 916). Here, the read data may be transferred from the memory device 150 to the controller 130. According to an embodiment, when a read operation is performed in response to a read command input from the external device such as the host 102 shown in FIGS. 2 and 3, the controller 130 may output the read data to the external device. When the read data is output (operation 916), the memory system 110 may terminate the read operation (operation 919).

Figure 15:
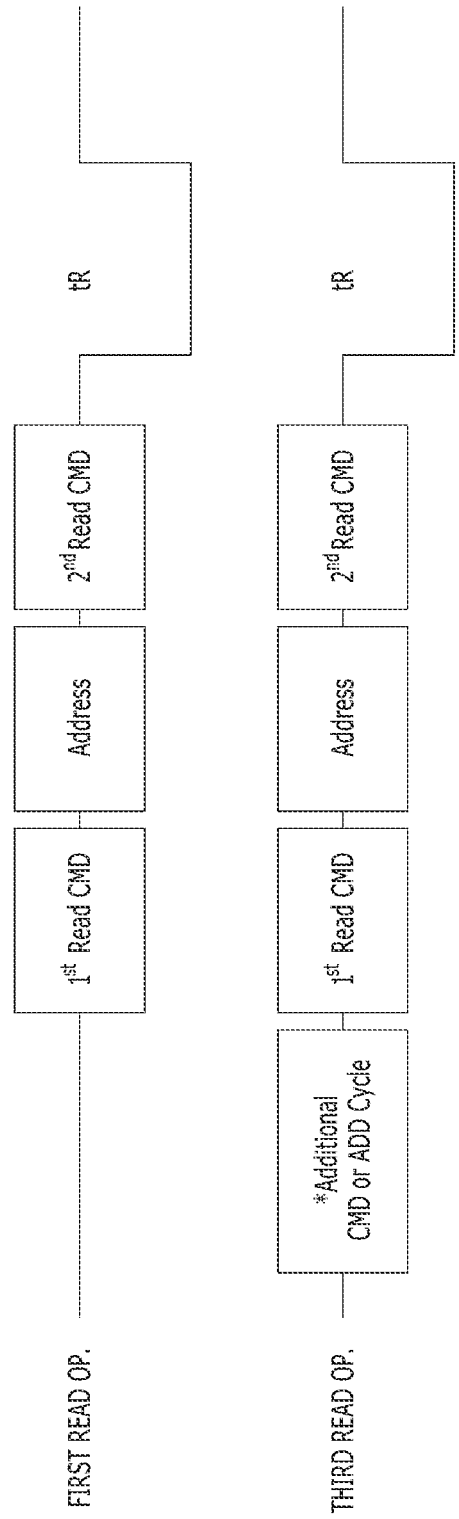
FIG. 15 illustrates an operation margin for the read operation shown in FIG. 14 according to an embodiment of the present disclosure.

FIG. 15 illustrates an operation margin for the read operation shown in FIG. 14 according to an embodiment of the present disclosure.

Referring to FIG. 15, two different read operations performed by the memory system 110 will be described. First, the first read operation (FIRST READ OP.) may be performed when all of the multi-bit data is programmed in a non-volatile memory cell included in the memory device 150. The controller 130 may transmit a first read command ($1^{st}$ Read CMD), an address of the non-volatile memory cell, and a second read command ($2^{nd}$ Read CMD) to the memory device 150. In this case, the address of the non-volatile memory cell r ay include a physical address converted by the flash translation layer 240 in the controller 130. The memory device 150 may output read data obtained from the non-volatile memory cell in response to the read command and the address during a read operation margin tR.

Moreover, a second read operation (SECOND READ OP.) may be performed when all multi-bit data is not programmed in the non-volatile memory cells included in the memory device 150. Unlike the first read operation (FIRST READ OP.), the second read operation (SECOND READ OP.) can include an additional operation (Program Step Hint) for checking a program status in the memory device 150 before transmission of the first read command ($1^{st}$ Read CMD), the address of non-volatile memory cells, and the second read command ($2^{nd}$ Read CMD), which is performed by the controller 130. For example, in the additional operation (Program Step Hint) for checking the program state, the controller 130 may check a register configured to store the program status of the non-volatile memory cells that are a target of the third read operation (THIRD READ OR). According to an embodiment, the controller 130 may store in the register, whether a step-by-step program operation performed on the non-volatile memory cells has been completed, and the controller 130 may check the program status before performing a read operation on the corresponding non-volatile memory cells. When the memory device 150 stores in the register, whether the step-by-step program operation performed in the non-volatile memory cell has been completed, the controller 130 can check the program status through an operation for transferring a status check command or the like to check the status information stored in the memory device 150.

Referring to FIGS. 12 and 15, the read operation for the flag is additionally performed in the embodiment described with reference to FIG. 12, whereas a program state regarding whether the program operation is completed can be checked without a read operation in the embodiment described with reference to FIG. 15. Because an operation margin for the check operation (Program Step Hint) for checking the program state of the non-volatile memory cells is smaller than that of the additional operation (Additional CMD & ADD cycle) for reading the non-volatile memory cells used as the flag, an operation speed of the read operation may be improved.

FIG. 16 illustrates a threshold voltage change of a non-volatile memory cell configured to store 4-bit data according to a first program method according to an embodiment of the present disclosure.

Referring to FIG. 16, 4-bit data may be stored in a non-volatile memory cell, and the 4-bit data may be sequentially programmed through four step program operations. The program method described with reference to FIG. 16 may be substantially the same as the first program method (Case1) described with reference to FIG. 10.

When a step-by-step program operation is performed through the first program method (Case1), the change of threshold voltages of the non-volatile memory cells may be inferred in advance because it relates to operating characteristics. The memory system 110 may recognize a program state of the non-volatile memory cells by checking status information indicating whether a stepwise program operation is completed.

When the memory system 110 recognizes the program state of the non-volatile memory cells, the memory system 110 may adjust or change a level of a read voltage (LSB Read) applied for reading LSB data to the non-volatile memory cells based on the program state. For example, the level of the read voltage (LSB Read) applied for reading the LSB data may increase as more bit data are programmed into the non-volatile memory cells as the number of times the program operation is completed increases.

FIG. 17 illustrates a threshold voltage change of a non-volatile memory cell configured to store 4-bit data according to a second program method according to an embodiment of the present disclosure.

Referring to FIG. 17, 4-bit data may be stored in a nonvolatile memory cell, and the 4-bit data may be sequentially programmed through three step program operations. The program method described with reference to FIG. 17 may be substantially the same as the second program method (Case 2) described with reference to FIG. 10.

When a step-by-step program operation is performed through the second program method (Case 2), the threshold voltage change of the non-volatile memory cells may be estimated or inferred in advance because it relates to an operating characteristic. The memory system 110 may recognize the program state of the non-volatile memory cells by checking status information including whether a stepwise program operation is completed. According to an embodiment, the status information recorded in a register stored in the controller 130 or the memory device 150 can include information indicating whether the step-by-step program operation is completed.

When the memory system 110 recognizes the program state of the non-volatile memory cells, a level of a read voltage (LSB Read) applied for reading LSB data may be adjusted or changed according to the program state. For example, the level of the read voltage (LSB Read) applied for reading the LSB data may be increased, as more bit data is programmed into the non-volatile memory cells as the number of times the step program operation is completed increases.

FIG. 18 illustrates a threshold voltage change of a non-volatile memory cell configured to store 4-bit data according to a third program method according to an embodiment of the present disclosure.

Referring to FIG. 18, 4-bit data may be stored in a non-volatile memory cell, and the 4-bit data may be sequentially programmed through two step program operations. The program method described with reference to FIG. 18 may be substantially the same as the third program method (Case3) described with reference to FIG. 10.

When each of the two step program operations are performed through the third program method (Case3), the threshold voltage change of the non-volatile memory cells may be estimated or inferred because of operating characteristics. The memory system 110 may recognize the program state of the non-volatile memory cells by checking status information including a program success/failure such as whether the step program operation is completed.

When the memory system 110 recognizes the program state of the non-volatile memory cells, the memory system 110 may adjust a level of a read voltage (LSB Read) applied for reading LSB data based on the program state. For example, the memory system 110 may include a read voltage table including information regarding levels of the read voltage corresponding to the threshold voltage change of the non-volatile memory cells according to each of the two step program operations. Based on the read voltage table, the memory system 110 may change or adjust the level of the read voltage (LSB Read) applied for reading LSB data based on the program state.

As above described, a memory system according to an embodiment of the present disclosure can provide an apparatus and a method for reading bit data stored in a non-volatile memory cell configured to store multi-bit data, even though only some bits of data among the multi-bit data are stored in the non-volatile memory cell, thereby using resources efficiently because the memory system does not have to maintain write data in a data buffer for ensuring data safety during a data one-shot program performed within the memory system.

Further, according to an embodiment of the present disclosure, a memory system does not have to program dummy data when write data stored in a non-volatile memory cell capable of storing multi-bit data is not sufficient. The memory system can program only some bit data without dummy data in the non-volatile memory cell and perform a read operation on programmed bit data in the non-volatile memory cell even though all of the multi-bit data is not programmed in the non-volatile memory cell. The memory system does not have to program dummy data in a memory device including the non-volatile memory cell.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment nay include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein, Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments

What is claimed is:

1. A memory device comprising:
   a first memory group including a first non-volatile memory cell configured to store multi-bit data; and
   a control device configured to:
   perform plural program operations to store the multi-bit data in the first non-volatile memory cell;
   perform, in response to a read command before most significant bit data among the multi-bit data is programmed into the first non-volatile memory cell, a read operation for obtaining bit data, which has been programmed in the first non-volatile memory cell among the multi-bit data, according to a program state of the first non-volatile memory cell while the plural program operations are performed; and
   output the bit data obtained in response to the read command,
   wherein the control device comprises a data buffer, which comprises volatile memory cells and is configured to temporarily store write data including the multi-bit data to be stored in the first non-volatile memory cell, and
   wherein the control device is further configured to remove a part of the write data, corresponding to the bit data, from the data buffer, after the bit data has been programmed in the first non-volatile memory cell and before all of the multi-bit data is programmed in the first non-volatile memory cell.

2. The memory device according to claim 1, wherein the memory device is configured to determine the program state based on a number of bits of data programmed in the first non-volatile memory cell among the multi-bit data.

3. The memory device according to claim 1, wherein the control device is further configured to change a level of a read voltage applied to the first non-volatile memory cell during the read operation according to the program state of the first non-volatile memory cell.

4. The memory device according to claim 1, wherein the control device is further configured to raise a level of a read voltage to be applied to the first non-volatile memory cell for reading the least significant bit data as a number of bits of data programmed in the first non-volatile memory cell increases among the multi-bit data.

5. The memory device according to claim 1, wherein the control device is configured to perform the plural program operations in the first non-volatile memory cell in an order of least significant bit data to the most significant bit data among the multi-bit data.

6. The memory device according to claim 1,
   further comprising a second memory group including a second non-volatile memory cell storing a flag corresponding to the program state regarding the first non-volatile memory cell,
   wherein the control device is further configured to read the flag stored in the second non-volatile memory cell to recognize the program state regarding the first non-volatile memory cell before performing the read operation for the first non-volatile memory cell.

7. The memory device according to claim 6, wherein the control device is further configured to perform an error correction operation on data obtained from the first memory group while skipping the error correction operation on the flag obtained from the second memory group.

8. The memory device according to claim 1, further comprising a register configured to record information representing whether a program operation is completed with respect to bit data most recently programmed in the first non-volatile memory cell among the multi-bit data.

9. The memory device according to claim 8, wherein the control device is further configured to perform a program state check operation regarding the first non-volatile memory cell to recognize the program state based on the information recorded in the register.

10. A method for operating a memory system, comprising:
    buffering write data input from a host in a volatile memory;
    assigning the write data to be programmed as multi-bit data in a first non-volatile memory cell;
    programming least significant bit data among the multi-bit data in the first non-volatile memory cell that is configured to store the multi-bit data;
    releasing a part of the write data corresponding to the least significant bit data from the volatile memory;
    performing a read operation on the least significant bit data programmed in the first non-volatile memory cell in response to a read command before programming most significant bit data among the multi-bit data in the first non-volatile memory cell; and
    outputting the least significant bit data in response to the read command to the host.

11. The method according to claim 10, further comprising:
    programming a flag, which indicates whether the programming of the least significant bit data is completed in the first nonvolatile memory cell, in a second non-volatile memory cell;
    programming, in the first non-volatile memory cell, bit data other than the least significant bit data among the multi-bit data; and
    updating the flag in response to whether the programming of the bit data other than the least significant bit data is completed.

12. The method according to claim 11, further comprising:
    terminating a program operation regarding the first non-volatile memory cell after the programming the bit data is completed when the bit data other than the least significant bit data is the most significant bit data;
    programming, in the first non-volatile memory cell when the bit data other than the least significant bit data is not the most significant bit data, another bit data other than the least significant bit data among the multi-bit data; and
    updating the flag according to whether the programming of the another bit data other than the least significant bit data is completed.

13. The method according to claim 10, further comprising:
    storing, in a register, an indicator showing whether the programming of the least significant bit data is completed after the programming of the least significant bit data is completed;
    programming, in the first non-volatile memory cell, bit data other than the least significant bit data among the multi-bit data; and
    updating the indicator in the register according to completion of the programming of the bit data other than the least significant bit data.

14. The method according to claim 10, wherein the performing the read operation comprises:
    determining a level of a read voltage according to a program state of the first non-volatile memory cell; and reading the least significant bit data from the first non-volatile memory cell by applying the read voltage having the determined level to the first non-volatile memory cell.

15. The method according to claim 14, further comprising:
determining the program state based on a number of bits of data programmed in the first non-volatile memory cell among the multi-bit data.

16. The method of claim 15,
wherein the multi-bit data is programmed in the first non-volatile memory cell in an order of the least significant bit to most significant bit data, and
wherein the level of the read voltage is increased as the number of bits of data programmed in the first non-volatile memory cell increases among the multi-bit data.

17. A memory system comprising:
a memory die comprising a first non-volatile memory cell configured to store multi-bit data; and
a controller configured to read, in response to a read command before most significant bit data among the multi-bit data is programmed into the first non-volatile memory cell, bit data already programmed in the first non-volatile memory cell according to a program state of the first non-volatile memory cell,
wherein the bit data is a part of the multi-bit data,
wherein the controller comprises a data buffer, which comprises volatile memory cells and is configured to temporarily store write data including the multi-bit data to be stored in the first non-volatile memory cell, and
wherein the controller is further configured to remove a part of the write data, corresponding to the bit data, from the data buffer, after the bit data has been programmed in the first non-volatile memory cell and before all of the multi-bit data is programmed in the first non-volatile memory cell.

18. The memory system according to claim 17,
wherein the controller is configured to determine the program state based on a number of bits of data programmed in the first non-volatile memory cell among the multi-bit data, and
wherein the controller is configured to determine a level of a read voltage based on the program state and perform a read operation for obtaining the bit data by applying the read voltage to the first non-volatile memory cell.

* * * * *